US008959007B2

(12) United States Patent
Khella

(10) Patent No.: US 8,959,007 B2
(45) Date of Patent: Feb. 17, 2015

(54) MONITORING SYSTEM

(75) Inventor: Mandeep Singh Khella, Leicester (GB)

(73) Assignee: BAE Systems PLC, London (GB)

( * ) Notice: Subject to any disclaimer, the term of this patent is extended or adjusted under 35 U.S.C. 154(b) by 464 days.

(21) Appl. No.: 13/387,917

(22) PCT Filed: Aug. 2, 2010

(86) PCT No.: PCT/GB2010/051266
§ 371 (c)(1),
(2), (4) Date: Jan. 30, 2012

(87) PCT Pub. No.: WO2011/015855
PCT Pub. Date: Feb. 10, 2011

(65) Prior Publication Data
US 2012/0130701 A1 May 24, 2012

(30) Foreign Application Priority Data

Aug. 3, 2009 (EP) .................................... 09275056
Aug. 3, 2009 (GB) .................................. 0913424.8

(51) Int. Cl.
G06G 7/62 (2006.01)
G05B 17/02 (2006.01)
G06F 9/44 (2006.01)

(52) U.S. Cl.
CPC . G05B 17/02 (2013.01); G06F 8/34 (2013.01); G05B 2219/37027 (2013.01)
USPC ........................................................... 703/13

(58) Field of Classification Search
None
See application file for complete search history.

(56) References Cited

U.S. PATENT DOCUMENTS

| 5,195,046 | A | * | 3/1993 | Gerardi et al. | 702/35 |
| 6,796,980 | B2 | * | 9/2004 | Hall | 606/34 |
| 7,031,778 | B2 | * | 4/2006 | Hsiung et al. | 700/29 |
| 7,580,820 | B2 | * | 8/2009 | Sawada | 703/8 |
| 2003/0033032 | A1 | * | 2/2003 | Lind et al. | 700/52 |
| 2006/0155486 | A1 | * | 7/2006 | Walsh et al. | 702/32 |
| 2006/0259217 | A1 | * | 11/2006 | Gorinevsky et al. | 701/29 |
| 2008/0074276 | A1 | * | 3/2008 | Valencia et al. | 340/635 |
| 2008/0297333 | A1 | | 12/2008 | Khuzadi | |
| 2009/0037155 | A1 | * | 2/2009 | Glomann et al. | 703/2 |

(Continued)

OTHER PUBLICATIONS

Banks et al. Platform Degrader Analysis for the Design and Development of Vehicle Health Management Systems 2008 International Conference on Prognostics and Health Management, IEEE.*

(Continued)

*Primary Examiner* — Omar Fernandez Rivas
*Assistant Examiner* — Cuong Luu
(74) *Attorney, Agent, or Firm* — Finch & Maloney PLLC

(57) ABSTRACT

A method for designing a secondary sub-system for monitoring the condition of a platform is disclosed. The platform can include one or more primary sub-systems. The method can include identifying stakeholders of the platform, capturing information requirements of the stakeholders, determining data requirements corresponding to the information requirements, defining a sensor array comprising sensors suitable for providing output signals relating to condition characteristics of the one or more primary sub-systems, and defining procedures for converting the output signals from the sensor array to the data requirements, thereby to fulfil the information requirements of the stakeholders. The method can be implemented using a design tool having a graphical user interface with a hierarchical layer structure.

22 Claims, 22 Drawing Sheets

(56) References Cited

U.S. PATENT DOCUMENTS

2010/0036269 A1* 2/2010 Ferren et al. .................. 600/504
2010/0060604 A1* 3/2010 Zwart et al. ................... 345/173
2014/0126425 A1* 5/2014 Burd et al. .................... 370/255

OTHER PUBLICATIONS

Kurtoglu et al. Integrating System Health Management into the Early Design of Aerospace System Using Functional Fault Analysis 2008 International Conference on Prognostics and Health Management, IEEE.*

Notification Concerning Transmittal of International Preliminary Report on Patentability (Forms PCT/IB/326 and PCT/IB/373) and the Written Opinion of the International Searching Authority (Form PCT/ISA/237) issued on Feb. 16, 2012, in corresponding International Application No. PCT/GB2010/051266. (10 pages).

International Search Report (PCT/ISA/210) issued on Nov. 8, 2010, by British Patent Office as the International Searching Authority for International Application No. PCT/GB2010/051266.

Written Opinion (PCT/ISA/237) issued on Nov. 8, 2010, by British Patent Office as the International Searching Authority for International Application No. PCT/GB2010/051266.

Search Report issued on Jan. 29, 2010, by European Patent Office for Application No. 09275056.1.

Kacprzyski et al., "Extending FMECA—health management design optimization for aerospace applications", Aerospace Conference, IEEE Proceedings, 2001, pp. 3105-3112, vol. 6.

Khella et al., "A Holistic View for the Specification of a Health Management System", 18th Advances in Risk and Reliability Technology Symposium, Apr. 2009.

* cited by examiner

Conventional Military Aircraft Systems

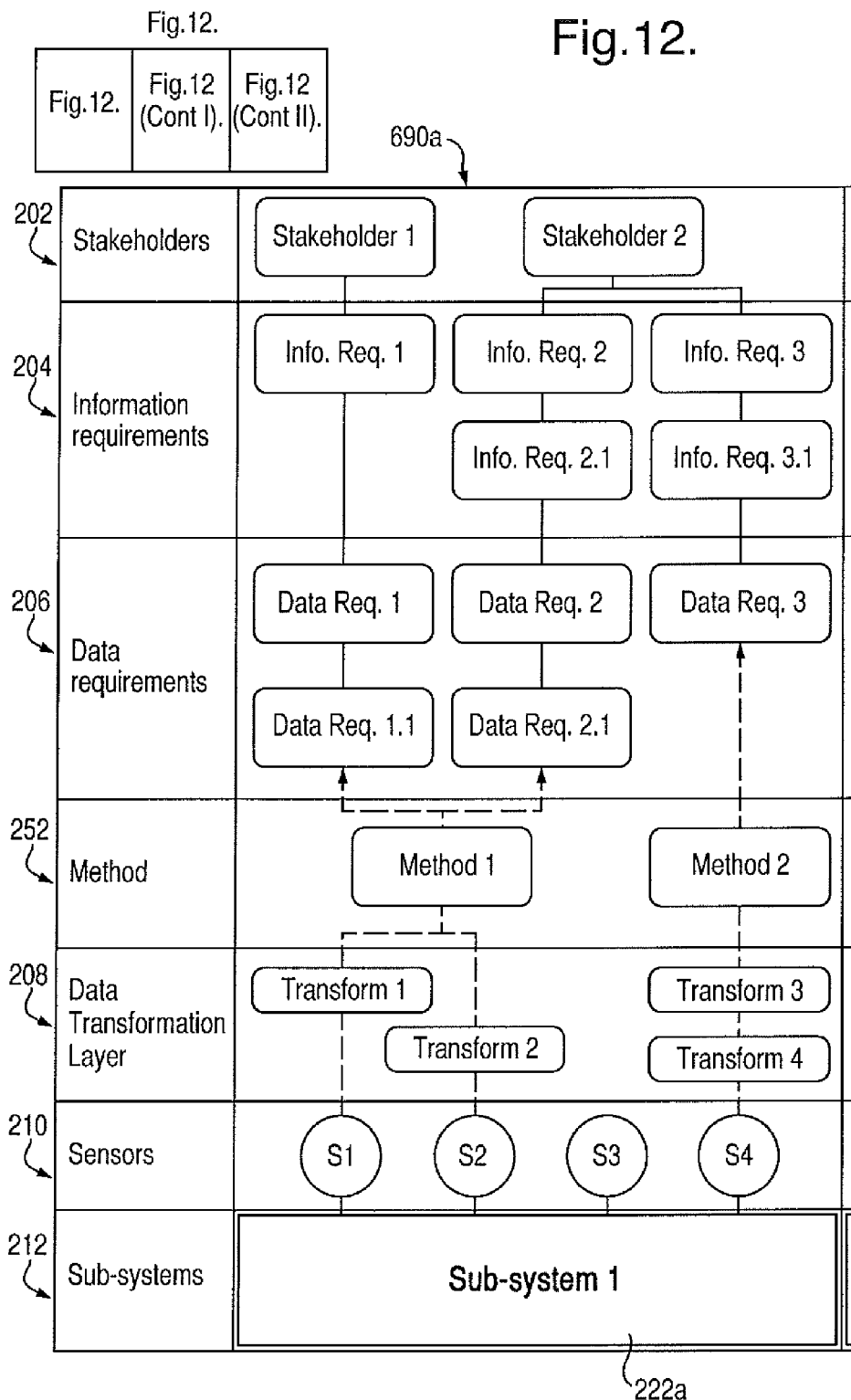

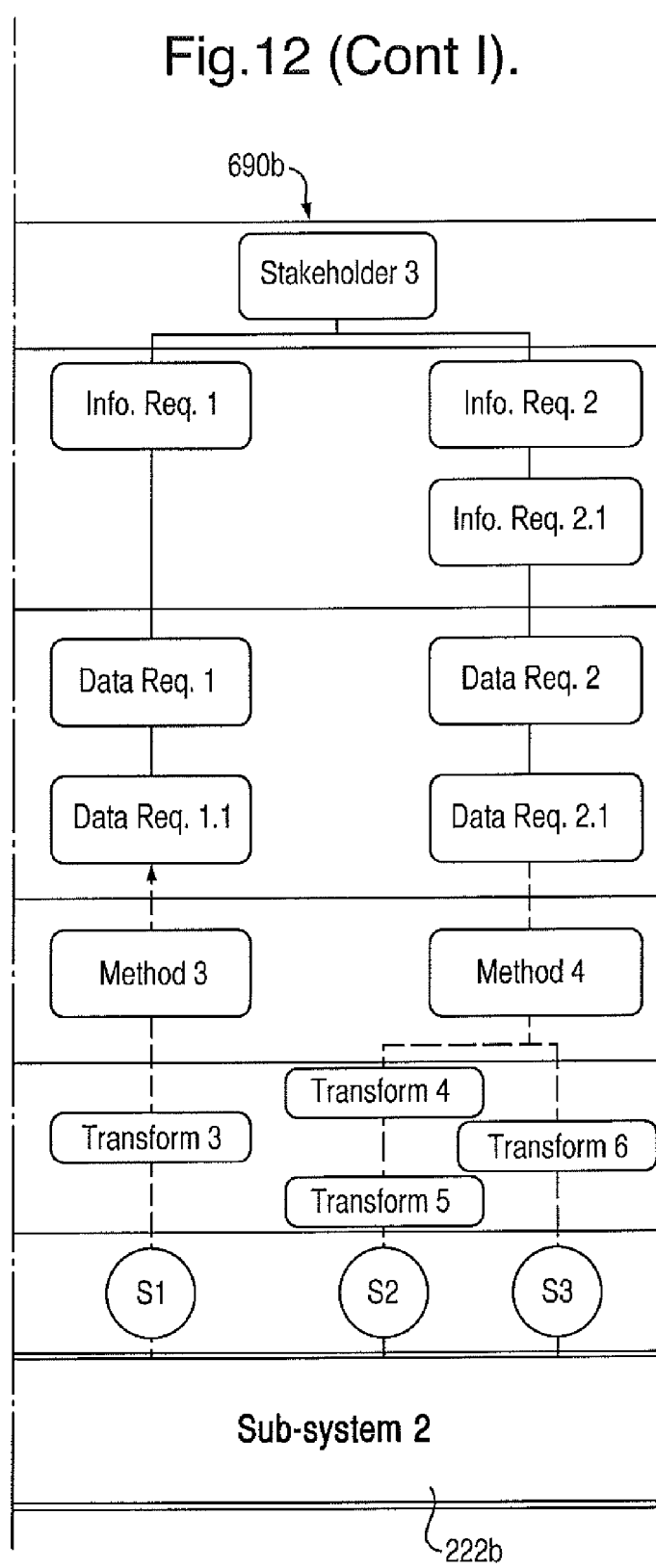
Fig.12 (Cont I).

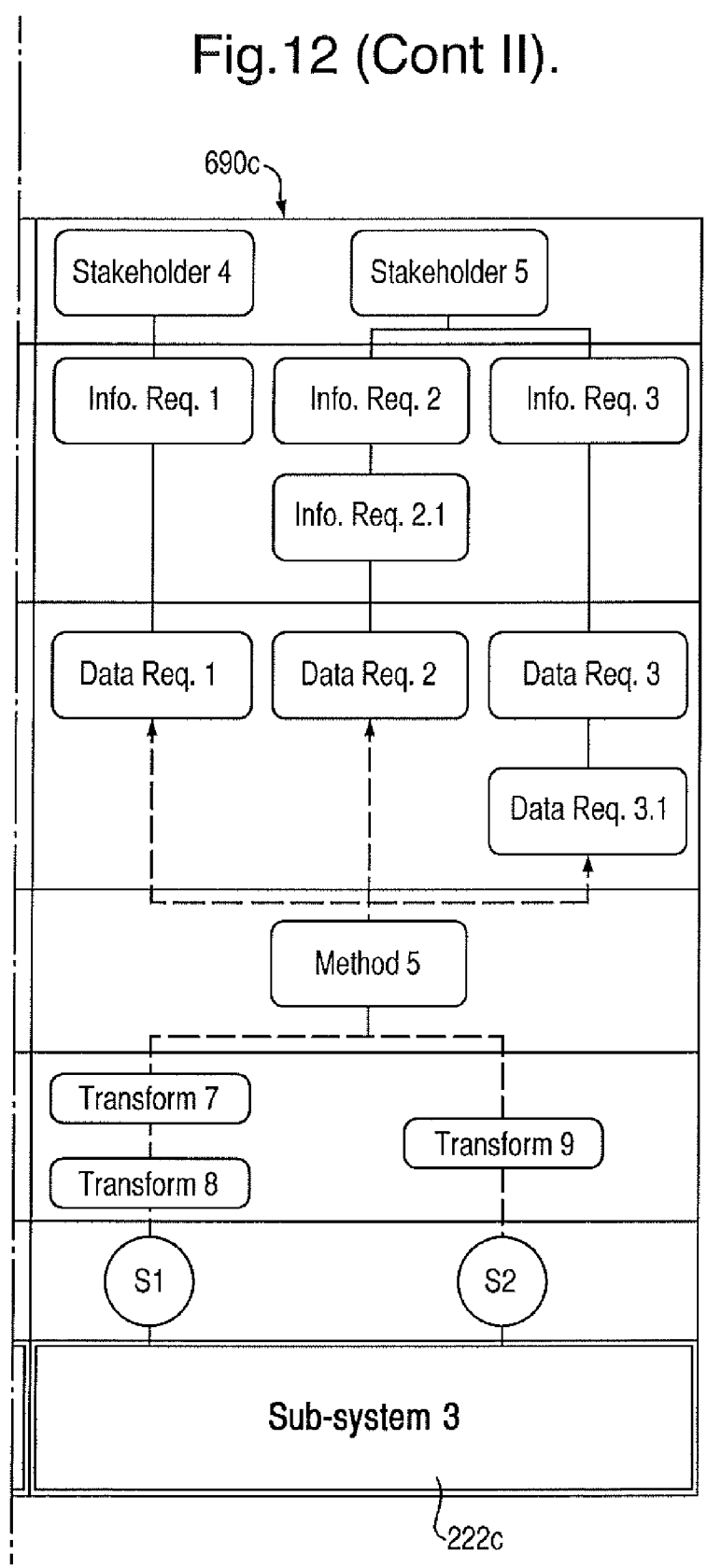

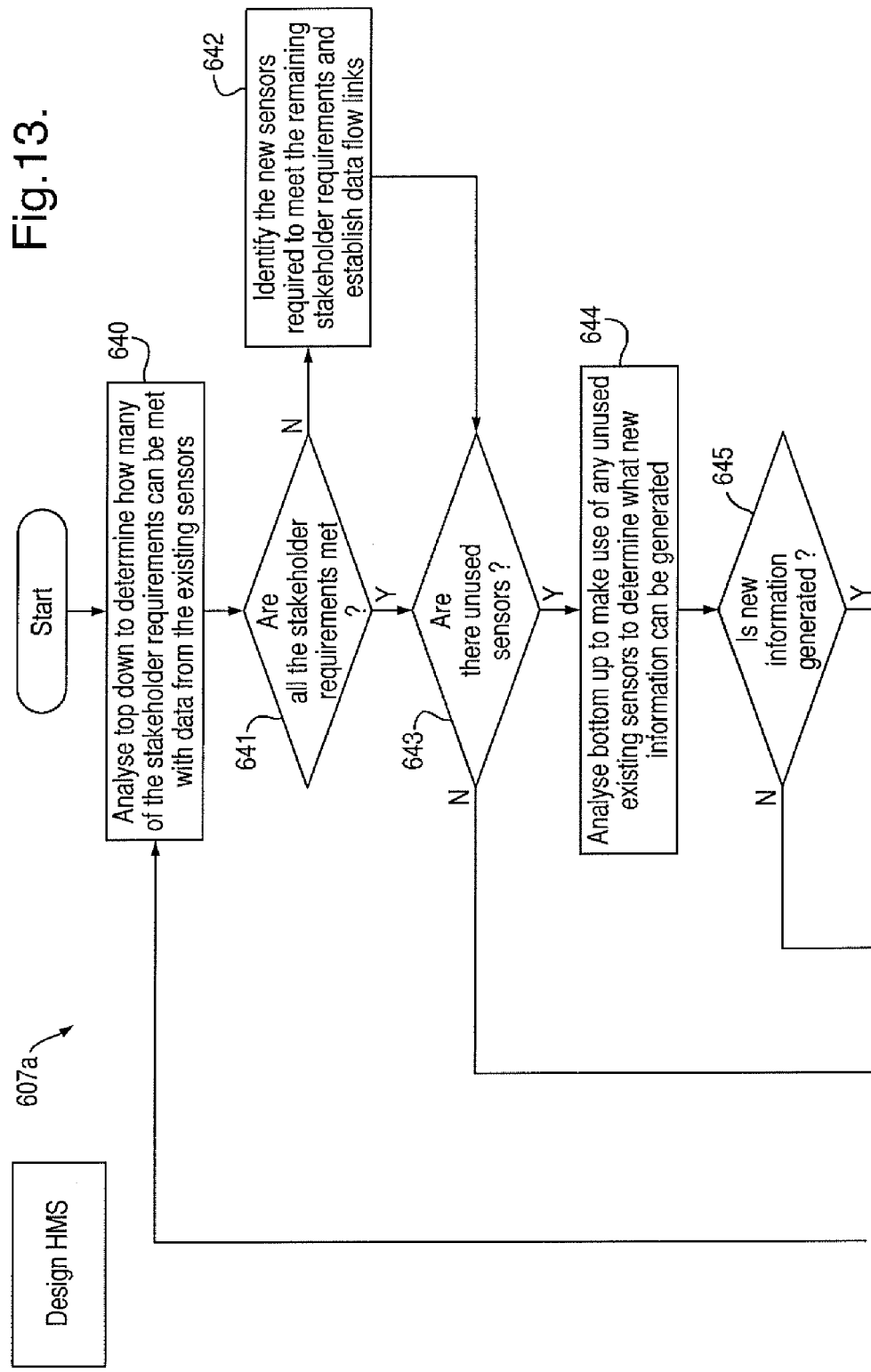

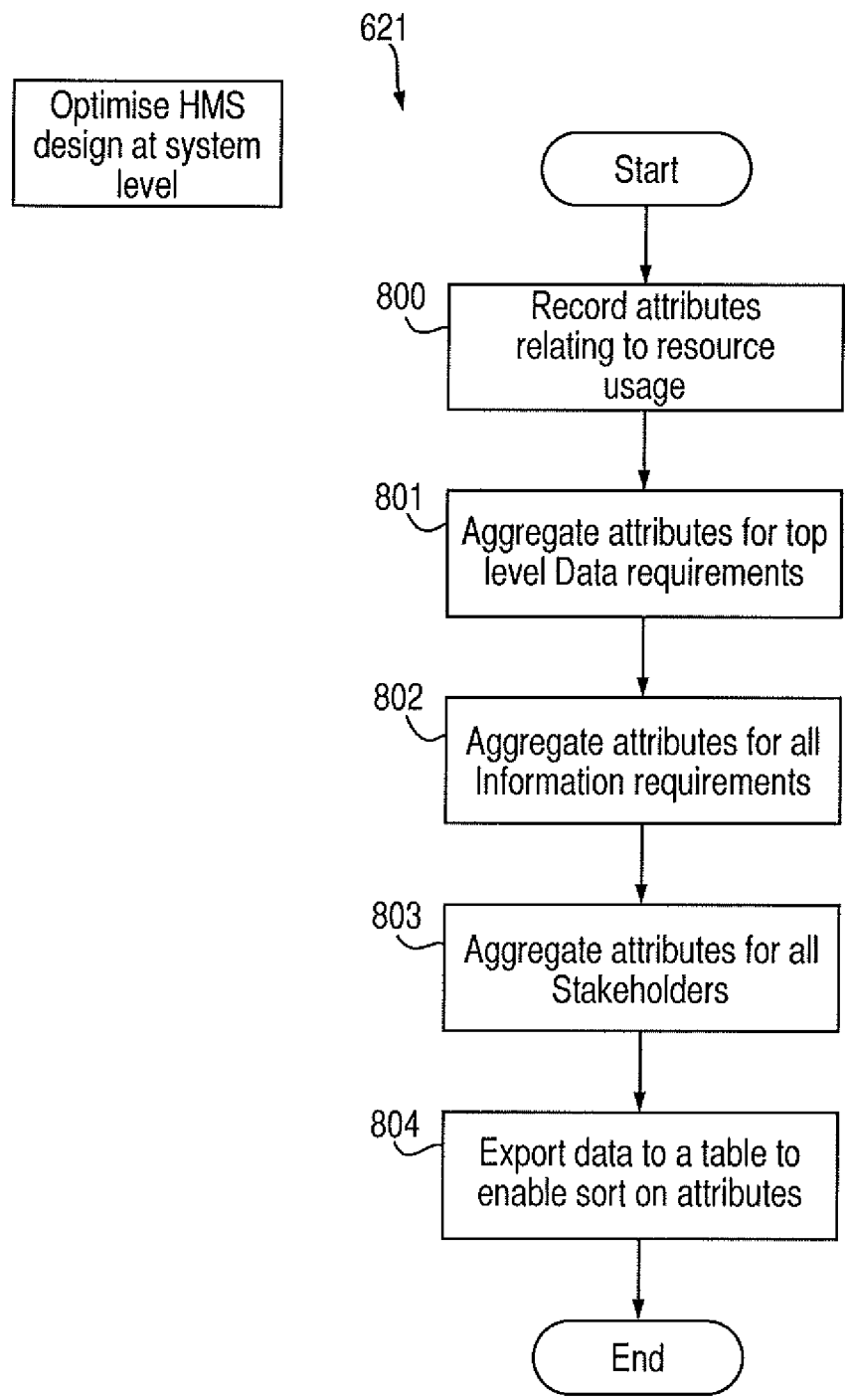

MONITORING SYSTEM

FIELD OF THE INVENTION

A monitoring system is disclosed, such as a sub-system for monitoring a primary system. In one example, a health management system is disclosed for monitoring a plurality of sub-systems of a platform, such as a vehicle platform (for example an aircraft), and a method for designing such a health management system is also disclosed.

BACKGROUND TO THE INVENTION

Complex, highly-integrated systems have become commonplace in many areas of technology. Examples of highly-integrated systems include mobile vehicles such as modern fast jet fighters and civilian airliners, unmanned aerial vehicles, industrial structures such as power plants, chemical plants and off-shore oil and gas platforms, and large-scale experimental apparatus such as particle accelerators and fusion reactors. Each of these systems can be considered as a platform that hosts a large number of sub-systems, each sub-system being arranged to perform a specific function of the overall system and to communicate with other sub-systems as necessary. The sub-systems may share common resources of the platform, such as in a so-called 'tightly coupled' system, or sub-systems may be essentially independent of one another.

By way of example, FIG. 1 shows, schematically, the major systems and sub-systems in a generic military aircraft (adapted from Moir and Seabridge, "Design and Development of Aircraft Systems", Professional Engineering Publishing, ISBN 978-1-86058-437-4). The aircraft platform 100 hosts a plurality of sub-systems 102. The sub-systems 102 are grouped into four system categories 104, according to the general function to which the sub-systems contribute. For example, the vehicle systems category includes the sub-systems responsible for propulsion, fuel storage and supply, flight control, landing gear and so on.

Many of the sub-systems 102 depend on other sub-systems 102 for their operation. For instance, the propulsion sub-system depends upon the fuel sub-system to supply fuel to the propulsion device. The fuel sub-system is, in turn, linked to a fire protection sub-system, which can selectively shut off the fuel supply in the event of a fire.

It will be appreciated from FIG. 1 that the aircraft platform 100 includes a large number of such inter-connected and inter-dependent sub-systems 102, many of which are critical to the ability of the aircraft to complete an assigned task safely and effectively. It is therefore desirable to monitor the condition of each sub-system 102 of the platform 100, so that the ability of the platform 100 to perform as required can be assessed.

In one context, monitoring the condition of the sub-systems of a platform is important in providing real-time diagnostic information to the operator of the platform, and to other sub-systems of the platform, about faults that have appeared in a sub-system. In this way, when a fault in a sub-system is detected, appropriate action can be taken to minimise the impact of the fault on the safety and operation of the platform and the success of the task it is performing. The diagnostic information can also be used to schedule maintenance of the platform, and to facilitate efficient repair of the platform through service and maintenance operations.

In another context, information about the condition of the sub-systems of a platform can be used in a prognostic manner. By analysing information about the condition of sub-systems of a platform during use, such as by collating historical information and developing models of behaviour, it is possible to predict more accurately the need for preventative maintenance, replacement of parts and so on, and to design more effectively the logistics supply chain required for supporting the platform. As a result, the costs of supporting the platform can be reduced by avoiding unnecessary maintenance, and the availability and reliability of the platform can be increased by minimising in-service failures and unscheduled maintenance.

Platform condition monitoring in the prognostic context is becoming increasingly valuable. The cost of keeping a complex platform available for use and mission-capable throughout its service life can be substantial and, as the complexity of platforms increases, there is an increasing desire to reduce or limit these through-life asset costs by providing an effective and efficient support and maintenance regime. Furthermore, it is becoming increasingly common for customers to lease platforms from manufacturers, rather than purchasing the platform and a support agreement. This arrangement, sometimes known as availability contracting, shifts the burden of through-life asset costs from the customer to the manufacturer, making it commercially important to consider integrating a means for monitoring the condition of sub-systems into the design of new platforms. Equally, it is important to consider adding such means to existing 'legacy' platforms.

It is known in the art to provide platforms with a sub-system that is capable of monitoring the condition, or 'health', of the sub-systems of a platform, and delivering the health information to operators, service personnel and other interested parties. Such systems are variously known in the art as integrated vehicle health management systems, health utilisation/usage monitoring/management systems, abnormal event detectors and diagnostic and prognostic systems. Systems of this type will be referred to hereafter as health management systems.

Design and development of a health management system for a new platform can be undertaken independently from the design of the platform itself. The result can be an inadequately integrated support capability. In the case of legacy platforms, a health management system can be designed on an ad-hoc basis and added to a legacy platform as required. However, designing a health management system for a legacy platform, or for a particularly complex new platform, can be problematic. For example, it can be difficult to elucidate the specifications (e.g. informational requirements) for a health management system, in terms of information that should or must be obtained, processed and output by the health management system so as to fulfil the needs of operators, service personnel and other users of the system.

Furthermore, without a clear understanding of these information specifications, it becomes difficult to produce a design for a health management system, in terms of the sub-systems that must or should be monitored, the sensors to be used for such monitoring, and the data processing to convert the output of such sensors into the desired information.

Against this background, it would be desirable to provide a method for designing a health management system that can address (e.g. overcome or mitigate) the above-mentioned issues and, correspondingly, a health management system having a structure that facilitates its design in such a way as to address these issues.

SUMMARY OF THE INVENTION

From one aspect, a method is disclosed for designing a secondary sub-system for monitoring the condition of a platform, the platform comprising at least one primary sub-system.

The method comprises identifying stakeholders of the platform, capturing information requirements of the stakeholders, determining data requirements corresponding to the information requirements, defining a sensor array comprising sensors suitable for providing output signals relating to condition characteristics of the at least one primary sub-system, and defining procedures for converting the output signals from the sensor array to the data requirements, thereby to fulfil the information requirements of the stakeholders.

The method allows the secondary sub-system to be designed in a logical and clear manner, leading to an efficient and fully functioning secondary sub-system design. Each step of the method captures the required design features of the secondary sub-system in a logical and generically-applicable order, aiding the design process of establishing logic to fulfil the information requirements of the stakeholders using raw data available from the primary sub-systems of the platform.

Preferably, by identifying the stakeholders first, the method advantageously allows the secondary sub-system to be designed in a 'top-down' manner, starting with an overview of those entities that require condition-related information from the platform, and working down to design a sub-system for obtaining that information.

Furthermore, unlike some existing methods for designing secondary sub-systems of a platform, the method according to the invention does not require a detailed analysis of the primary sub-systems in order to design the secondary sub-system. Instead, the present invention allows the design of the secondary sub-system to proceed holistically and at a high level so that the merits of including or utilising a sensor to meet a stakeholder requirement can be understood by the designer without the need for time-consuming analysis of the details of a platform. Indeed, if necessary, the method allows the design of the secondary sub-system to proceed even before the details of the primary sub-systems are known.

One application of the method is in the design of a health management system for a platform, in which the condition of the platform is used to assess the needs of the platform in terms of servicing and maintenance, the platform's availability for service, and the platform's operational capability at a given time. However, the method is not limited to designing such a system.

For example, another application of the method is the design of a secondary sub-system that provides information on the platform's condition to an operator during operation of the platform, allowing the operator to make decisions. Examples of such decisions may include deciding to refuel the platform, or deciding to abort or modify a task in view of information about degraded performance of the platform.

Yet another application of the method is the design of a secondary sub-system that provides information on the platform's condition to another sub-system that initiates logic that results in reconfiguration of the platform, to avoid loss or damage of the platform or other entities or to avoid failure of the task with which the platform is engaged.

Accordingly, the phrase 'monitoring the condition of the platform' should be construed broadly, and should be taken to encompass obtaining, retrieving and deriving any useful information generated by or pertaining to the platform.

The term 'stakeholders' should also be construed broadly, and should be taken to encompass any party or entity (such as an individual or another sub-system or platform) having an interest in the platform or in the at least one primary sub-system of the platform.

The term 'information requirements' should likewise be construed broadly, and should be taken to encompass any information that could be desired by a stakeholder. Accordingly, the terms 'information specifications' or 'information requests' could for example be used in place of 'information requirements'.

Similarly, the term 'data requirements' should be taken to encompass any data that could be desired in order to fulfil the information requirements. Accordingly, the term 'data specifications' could for example be used in place of 'data requirements'.

The method may include outputting a design for a secondary sub-system for monitoring the condition of the platform. In another example, the method includes converting the output signals of the sensors to the data requirements; and outputting the condition of the platform based on the data requirements.

When the platform comprises a plurality of primary sub-systems, the method preferably comprises, before defining the sensor array, identifying the primary sub-systems from which the data requirements can be fulfilled, and in this case the sensor array preferably comprises sensors suitable for providing output signals relating to condition characteristics of the identified primary sub-systems.

In one expression of the method, defining the sensor array comprises identifying existing sensors of the identified primary sub-systems having output signals suitable for conversion to fulfil the data requirements.

In this case, the step of defining the sensor array may advantageously further comprise identifying unfulfilled data requirements that cannot be fulfilled by the existing sensors, and specifying new sensors for inclusion in the sensor array so as to provide output signals suitable for fulfilling said unfulfilled data requirements.

In this way, the present invention advantageously identifies missing sensors in a sensor array of a platform.

The method may further comprise identifying any unused sensors in the sensor array whose output signals are not being used to fulfil the data requirements.

The identification of unused sensors can be useful in improving the efficiency of the sensor array, and hence the platform. For example, the method may comprise identifying any existing data requirements that could be fulfilled by said output signals of said unused sensors, and defining one or more procedures for converting said output signals to the existing data requirements.

Alternatively, or in addition, the method may further comprise identifying new data requirements that could be fulfilled by said output signals of said unused sensors, identifying new information requirements that could be fulfilled by said new data requirements, determining whether said new information requirements are useful to one or more stakeholders, and, if so, defining procedures for converting said output signals to said new data requirements.

The method may extend to optimising the sensor array by identifying any redundant sensors in the sensor array whose output signals are not required by the secondary sub-system, determining whether the output signals of the redundant sensors are required by a primary sub-system of the platform and, if one or more of the redundant sensors are not so required, removing those sensors from the sensor array. In this way, redundant sensors can be identified and removed.

The step of defining procedures preferably comprises defining a plurality of alternative procedures for converting one or more of the signals to one of the data requirements. Advantageously, a method classification is assigned to each one of the plurality of alternative procedures.

When a plurality of alternative procedures has been defined, the method may further comprise selecting one or more of the plurality of alternative procedures. Optionally, the method may also comprise determining an operating environment of the platform, and selecting one or more of the plurality of alternative procedures according to the operating environment.

One advantageous expression of the method comprises recording one or more attributes of each of the sensors in the sensor array; for each data requirement, aggregating the attributes of the sensors whose output signals are used to fulfil that data requirement to define data requirement attributes; for each information requirement, aggregating the data requirement attributes of the data requirements associated with that information requirement to define information requirement attributes; and, for each stakeholder, aggregating the information requirements attributes of the information requirements associated with that stakeholder to define stakeholder attributes.

By aggregating requirements in this way, the method generates information that can advantageously be used in a trade-off analysis during design of the secondary sub-system.

For example, one or more of the attributes may relate to resource usage of the sensors, in which case the method may further comprise optimising the design of the secondary sub-system by using one or more of the data requirements attributes, information requirements attributes and stakeholder attributes to determine a net resource usage of the respective data requirements, information requirements and stakeholders. The attributes of a sensor may include attributes of hardware or software associated with the sensor (such as sensor weight and accuracy, cabling weight, data storage capacity, data transfer bandwidth and processing related attributes).

Accordingly, the step of optimising the design of the secondary sub-system may optionally comprise eliminating one or more of the sensors, data requirements, information requirements and stakeholder based on the determined net resource usage.

Conveniently, the method may comprise representing or displaying the secondary sub-system in a graphical format, the graphical format comprising a hierarchical structure of information layers including a stakeholders layer including stakeholder blocks representing the stakeholders, an information requirements layer adjacent to the stakeholders layer and including information requirements blocks representing the information requirements, a data requirements layer adjacent to the information requirements layer and including data requirements blocks representing the data requirements. a data transformation layer adjacent to the data requirements layer and including procedure blocks representing the procedures for converting the output signals to the data requirements, a sensors layer adjacent to the data transformation layer and including sensor blocks representing the sensors, a sub-systems layer adjacent to the data transformation layer and including sub-system blocks representing the primary sub-systems of the platform, and connectors for representing information flows between blocks in adjacent layers.

By representing the secondary sub-system in a graphical format, design of the secondary sub-system can be carried out in a logical and convenient manner.

In such a case, the method may comprise verifying the design of the secondary sub-system by selecting a block in one of the information layers, determining whether the block is appropriately connected to blocks in adjacent layers, and, if the block is not appropriately connected, recording a failure in respect of that block. The step of recording a failure may, for example comprise providing a graphical indication relating to the block that is not appropriately connected.

From another aspect, a graphical user interface arranged to allow a user to design a secondary sub-system for monitoring the condition of a platform comprising a plurality of primary sub-systems using the method described above is disclosed. The graphical user interface comprises a hierarchical structure of information layers including:
   a stakeholders layer including stakeholder blocks representing the stakeholders;
   an information requirements layer adjacent to the stakeholders layer and including information requirements blocks representing the information requirements;
   a data requirements layer adjacent to the information requirements layer and including data requirements blocks representing the data requirements;
   a data transformation layer adjacent to the data requirements layer and including procedure blocks representing the procedures for converting the output signals to the data requirements;
   a sensors layer adjacent to the data transformation layer and including sensor blocks representing the signals;
   a sub-systems layer adjacent to the data transformation layer and including sub-system blocks representing the primary sub-systems of the platform; and
   connectors for representing information flows between blocks in adjacent layers.

By setting out the features of the secondary sub-system in this hierarchical manner, the graphical user interface assists in the design of the secondary sub-system. In particular, by providing connectors between blocks in adjacent layers, the passage of information from the sub-systems to the stakeholders can be tracked and understood.

From other aspects, a software tool arranged to allow a user to design a secondary sub-system for monitoring the condition of a platform comprising a plurality of primary sub-systems using the method as described above, and a computer program that, when loaded onto a computer, causes the computer to carry out the method are disclosed.

From another aspect, a sub-system for monitoring the condition of a platform including a plurality of further sub-systems is disclosed, the sub-system comprising:
   a stakeholder layer specifying stakeholders in the platform;
   an information requirements layer specifying condition-related information requirements of the stakeholders;
   a data requirements layer, comprising data requirements corresponding to the information requirements;
   a sensors layer comprising a plurality of sensors arranged to output signals relating to condition characteristics of the further sub-systems; and
   a data transformation layer comprising procedures for converting the output signals to the data requirements, thereby to fulfil the information requirements of the stakeholders.

From a further aspect, a method for assessing the suitability of an existing sensor array in a legacy platform for use in a sub-system for monitoring the condition of the platform is disclosed, the platform comprising a plurality of primary sub-systems being monitored by the existing sensor array, the method comprising:
   identifying stakeholders of the platform, each stakeholder being an entity that wishes to monitor the condition of a part of interest of the platform;
   capturing information requirements of the stakeholders, each information requirement being information that a stakeholder requires to monitor the part of interest;
   determining data requirements corresponding to the information requirements;

identifying the primary sub-systems from which the data requirements can be fulfilled;

defining a required sensor array having output signals suitable for conversion to fulfil the data requirements; and comparing the existing sensor array of the legacy platform with the required sensor array to determine the suitability of the existing sensor array.

The step of comparing the existing sensor array of the legacy platform with the required sensor array may advantageously comprise identifying missing sensors in the existing sensor array, the missing sensors being present in the required sensor array and absent in the existing sensor array.

The step of comparing the existing sensor array of the legacy platform with the required sensor array may, alternatively or in addition, comprise identifying surplus sensors in the existing sensor array, the surplus sensors being present in the existing sensor array and absent in the required sensor array.

The method may further comprise identifying new data requirements that could be fulfilled by said output signals of said surplus sensors.

In these ways, the invention can advantageously provide a method for assessing and optimising an existing sensor array in a legacy platform, and for modifying the sensor array to achieve improvements in the performance of the platform and the secondary sub-system.

From another aspect, a method for designing a secondary sub-system for monitoring the condition of a platform is disclosed, the platform comprising a plurality of primary sub-systems; the method comprising:

designing, for each one of the plurality of primary sub-systems, a respective module of the secondary sub-system by:

identifying stakeholders of the respective primary sub-system;

capturing information requirements of the stakeholders;

determining data requirements corresponding to the information requirements;

identifying the data requirements that can be fulfilled from the respective primary sub-system;

defining a sensor array comprising sensors suitable for providing output signals relating to condition characteristics of the respective primary sub-system; and defining procedures for converting the output signals from the sensor array to the data requirements, thereby to fulfil the information requirements of the stakeholders.

The method may, for example, further comprise integrating the modules of the secondary sub-system so as to design an integrated secondary sub-system for monitoring the condition of the platform.

Preferably, integrating the modules comprises identifying identical stakeholders, information requirements and data requirements present in two or more modules, and combining the identical stakeholders, information requirements, and data requirements.

By providing for design of the platform in a modular way, the addition of further primary sub-systems to the platform can readily be accommodated. Furthermore, a secondary sub-system for monitoring a complex platform, comprising many primary sub-systems, can be designed easily using the method.

In a further aspect, a method for monitoring the condition of a platform having at least one primary sub-system is disclosed. The method comprises identifying stakeholders of the platform; capturing information specifications of the stakeholders; determining data specifications corresponding to the information specifications; defining a sensor array having sensors suitable for providing output signals relating to condition characteristics of the at least one primary sub-system; defining procedures for converting the output signals from the sensor array to the data specifications, thereby to fulfil the information specifications of the stakeholders; converting the output signals of the sensors to the data specifications; and outputting the condition of the platform based on the data specifications. When the platform includes a plurality of primary subsystems, the method may comprise, before defining the sensor array, identifying the primary sub-systems from which data specifications can be fulfilled, and providing output signals from the sensors relating to condition characteristics of the primary sub-systems.

BRIEF DESCRIPTION OF THE DRAWINGS

Reference has already been made to FIG. 1 of the accompanying drawings, which shows, schematically, an arrangement of sub-systems within a generic military aircraft.

Illustrative embodiments of the present invention will now be described, by way of example only, with reference to the remaining drawings, in which like reference numerals are used for like features and in which:

FIG. 12 is a schematic diagram illustrating a design tool during an intermediate stage of design according to the method of FIG. 11;

FIG. 16 is a flowchart illustrating, in greater detail, an optimisation step of the method shown in FIG. 11.

DESCRIPTION OF THE EMBODIMENTS

Figure 1:
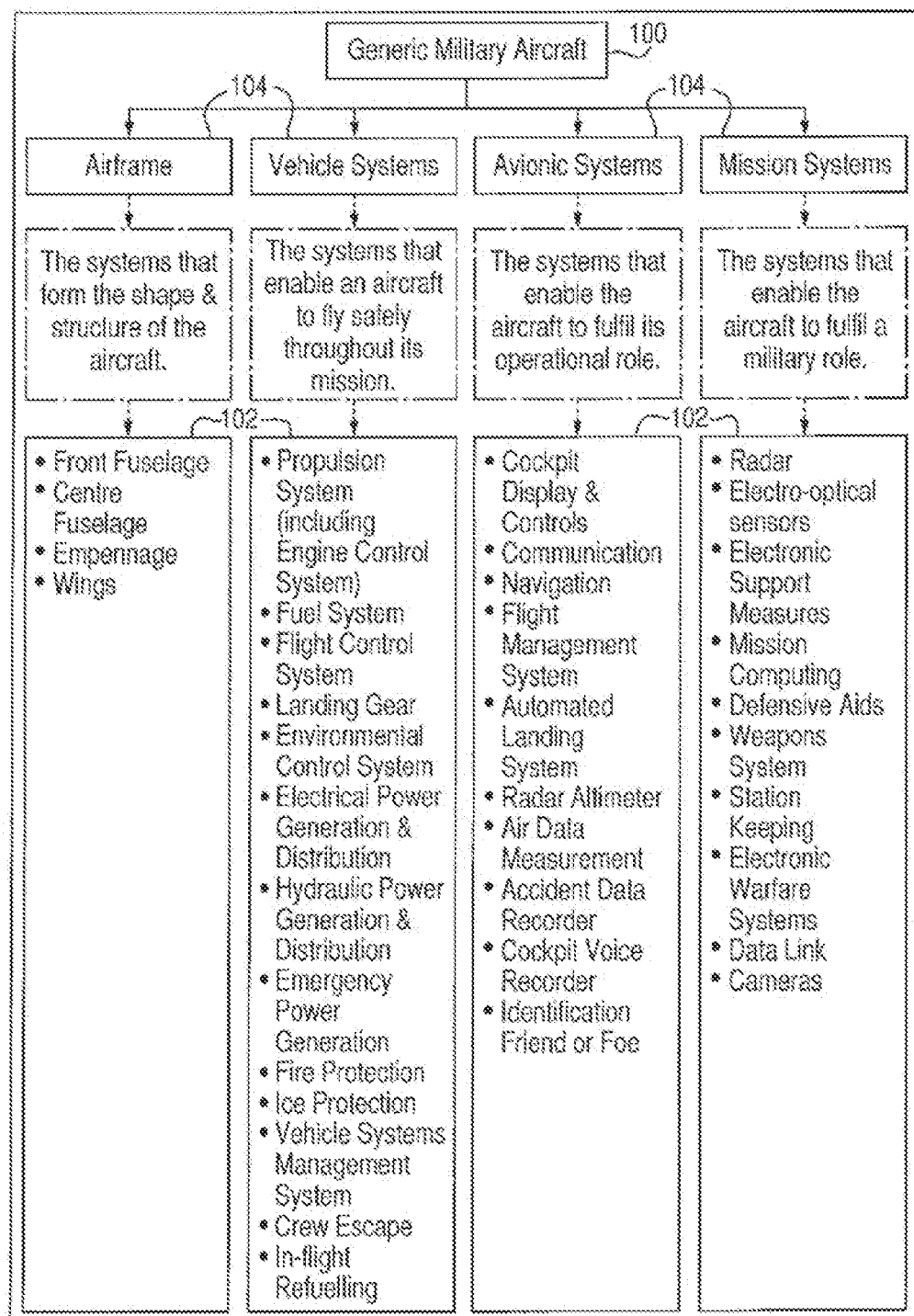
Figure 2:
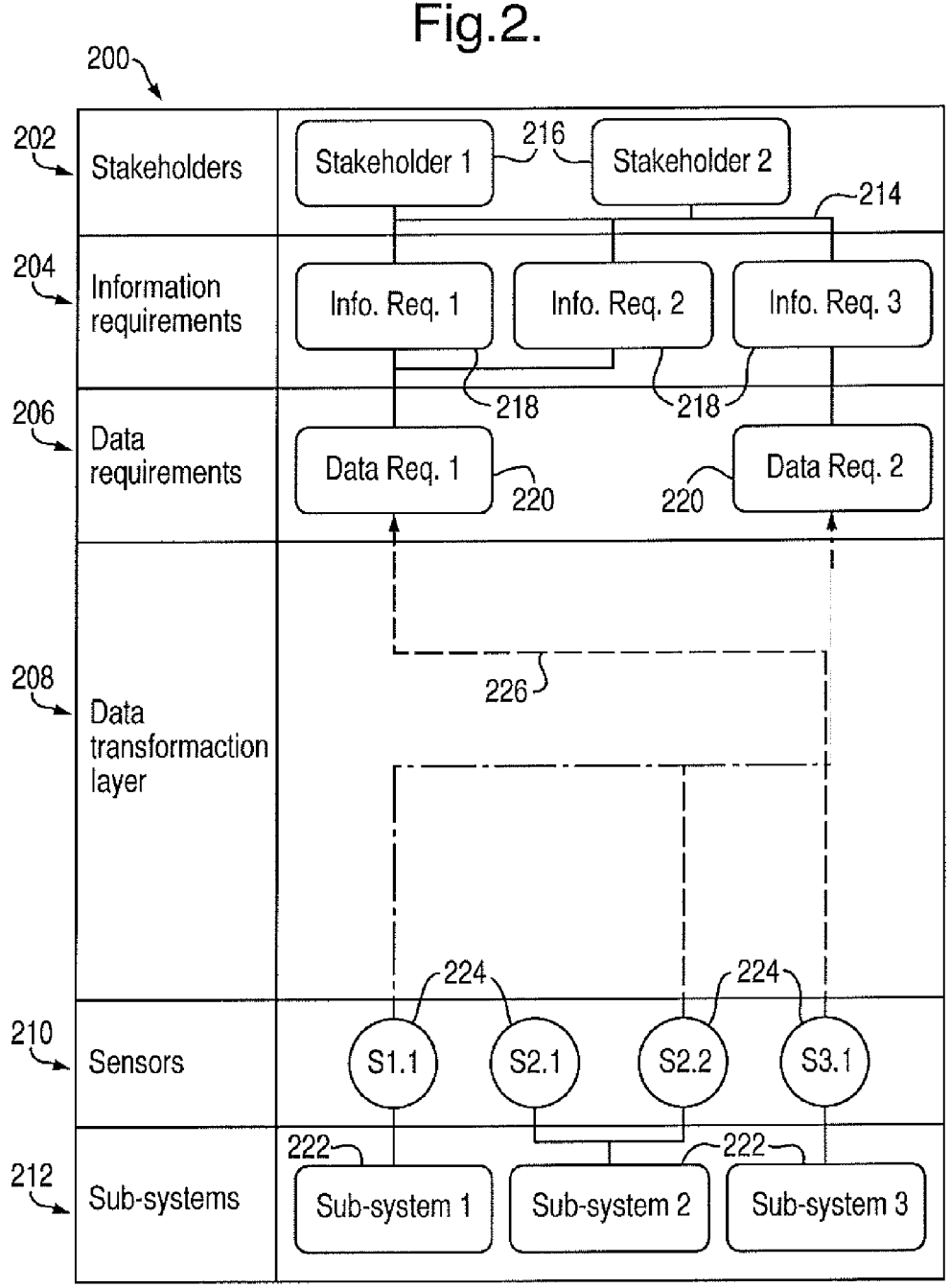
FIG. 2 is a schematic diagram of a first embodiment of a health management system.

FIG. 2 shows, schematically, a first embodiment of a secondary sub-system of a platform, in the form of a health management system 200. The health management system 200 is configured to monitor the health of a platform comprising a plurality of sub-systems, for example of the type shown generically in FIG. 1.

In FIG. 2, the health management system 200 is represented as a plurality of layers arranged in a hierarchical manner. Each layer represents an information type or procedure that can be populated when designing the health management system 200. In other words, each layer specifies the essential information required for the design of the health management system 200 in a logical and generic (i.e. not platform-specific) way. Therefore, FIG. 2 can be considered to represent schematically both the structure of the health management system 200 itself, and a graphical user interface of a design tool used to design a health management system 200, as will be explained in more detail below.

The health management system 200 comprises a stakeholders layer 202, an information requirements (or information specifications) layer 204, a data requirements (or data specifications) layer 206, a data transformation layer 208, a sensors layer 210, and a sub-systems layer 212.

As will be explained in more detail below, each layer includes one or more blocks, with each block representing a piece of information or an entity. Blocks in adjacent layers are linked to one another with connectors, one of which is indicated at 214 in FIG. 2. The connectors 214 represent data or information transfer paths between the layers.

The stakeholders layer 202 includes one or more stakeholder blocks 216. Two such stakeholder blocks 216, denoted stakeholder 1 and stakeholder 2, are shown in FIG. 2, although it will be appreciated that a different number of stakeholder blocks 216 could be provided. Each stakeholder block 216 represents an entity having an interest in the health of the platform, and therefore requiring or desiring information from the health management system 200.

For example, stakeholder blocks 216 could represent personnel such as the immediate operator or supervisor of the platform, higher-level controllers or commanders of the platform, platform maintenance and service personnel, maintenance managers, platform providers, providers of sub-systems of the platform, and the end user of the platform. Stakeholder blocks 216 could also represent system entities, such as emergency sub-systems of the platform that are configured to respond to failures of components of the platform. It is also conceivable that stakeholder blocks 216 could represent other platforms, such as logistics platforms for supplying spare parts to a maintenance site, or a back-up platform able to take the place of a primary platform to complete a task in the event that the primary platform fails.

The information requirements layer 204 includes one or more information requirement blocks 218. Three information requirement blocks 218 are shown in FIG. 2, but again it will be appreciated that a different number of such blocks could be present. Each information requirement block 218 represents a piece of information (also known as an information specification or, hereinafter, as an information requirement) that is required, desired or specified by one or more of the stakeholders identified in the stakeholders layer 202. For example, a stakeholder who is an operator of an aerial vehicle platform may need or wish to know, as an information requirement, whether the aerial vehicle is capable of completing its task and returning to base. A stakeholder who is responsible for scheduling servicing of the aerial vehicle may need or wish to know, as an information requirement, how many future tasks the vehicle can be expected to perform without failure.

Each stakeholder may generate or specify more than one information requirement, and several stakeholders could have the same information requirement. In the example of FIG. 2, both stakeholders share the same three information requirements, so the two stakeholder blocks 216 are each connected to the three information requirements blocks 218.

The data requirements layer 206 includes one or more data requirement blocks 220, each representing a piece of data (also known as a data specification or, hereinafter as a data requirement) that is required or desirable in order to fulfil the information requirements specified in the information requirements layer 204. For example, to fulfil an information requirement of whether an aerial vehicle is capable of completing its task, it would be necessary to know (amongst many other factors) the amount of fuel remaining and the expected fuel consumption for the remainder of the task. Thus, in that example, data requirements blocks 220 would be provided representing each of these factors.

The sub-systems layer 212 includes a plurality of sub-system blocks 222, each such block 222 representing a sub-system of the platform. Three sub-system blocks 222 are shown in FIG. 2, but a different number of sub-system blocks 222 could instead be provided. As will be explained in greater detail below, the sub-systems of the platform that are represented in the sub-systems layer 212 are those that generate or supply the data specified in the data requirements layer 206.

The sensors layer 210 comprises a plurality of sensors 224. Each sensor 224 is connected to a sub-system specified in the sub-systems layer 212, and is arranged to output a data signal relating to some condition-related aspect of the sub-system. For example, in an aerial vehicle platform having a fuel sub-system, a sensor 224 could be provided to deliver a proportional signal relating to the amount of fuel remaining for supply. Some sub-systems may be connected to a plurality of sensors, as exemplified by the sensors 224 labelled S2.1 and S2.2 in FIG. 2, which are both connected to sub-system 2.

The data transformation layer 208 defines how the raw data output from the sensors 224 in the sensor layer 212 is transformed to fulfil the data requirements identified in the data requirements layer 206, and thereby how the sensor output data fulfils the information requirements specified in the information requirements layer 204. The data transformation layer 208 therefore comprises data handling procedures or algorithms, represented generally as chain lines and dashed lines indicated at 226 in FIG. 2.

The structure of the health management system 200 can be understood in more detail by considering the process of designing the health management system 200. Accordingly, a method of designing such a system will now be explained with reference to the flowchart of FIG. 3.

In a first step 301 of the method 300, the stakeholders of the platform are identified by the designer. The stakeholders layer 202 is then populated, at step 311, with stakeholder blocks 216 corresponding to each stakeholder.

At step 302, the information requirements of the stakeholders are captured. This process may, for example, involve analysis of a stakeholder to determine what information that stakeholder requires from the health management system 200. The information requirements layer 204 is then populated, at step 312, with information requirement blocks 218 corresponding to each of the captured information requirements.

Additionally, connectors 214 are inserted to link each of the information requirement blocks 218 with one or more corresponding stakeholder blocks 216 to identify which of the stakeholders require the information specified in a given information block 218.

At step 303, the data requirements are determined, for example by considering what data are required to satisfy the information requirements of the stakeholders. Each of these data requirements is recorded in a data requirement block 220, so as to populate the data requirements layer 206 (step 313).

Again, connectors 214 are inserted to link each of the data requirements blocks 220 with the appropriate information requirements blocks 218.

The platform sub-systems that are capable of providing the raw data necessary to fulfil the data requirements are then identified at step 304. The sub-system layer 212 is then populated, at step 314, with sub-system blocks representing each of the identified sub-systems.

Figure 3:
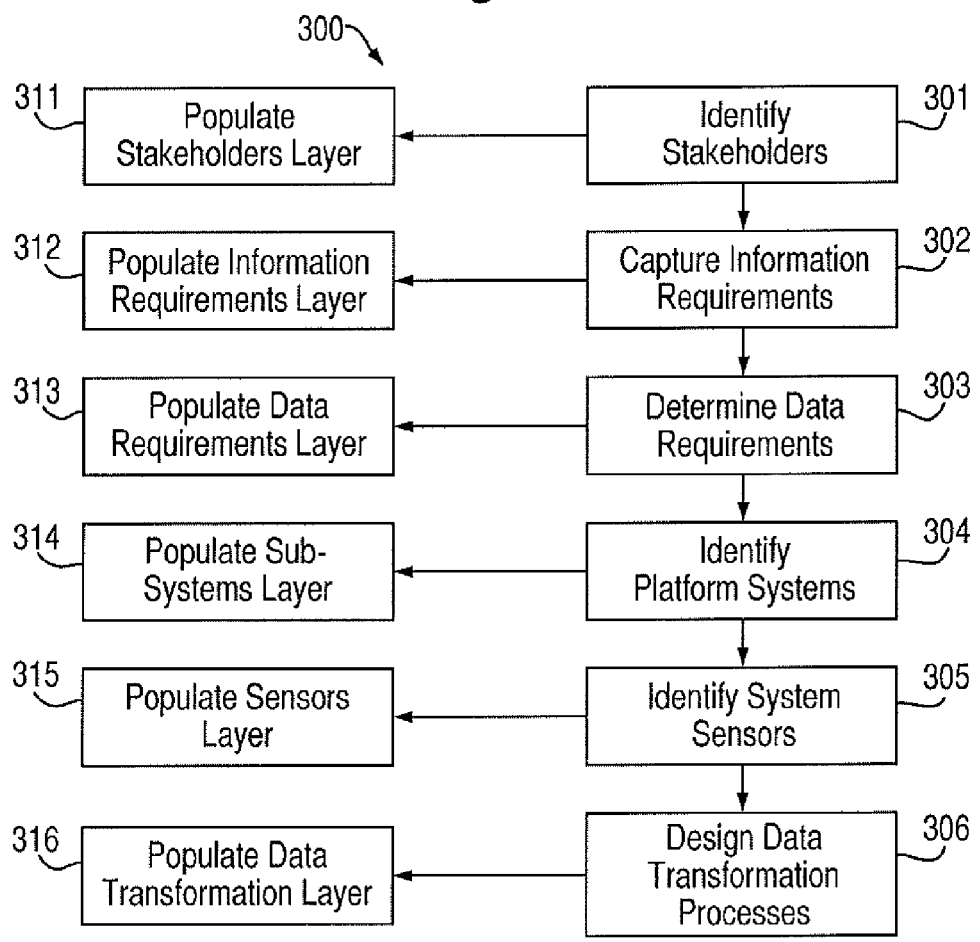
FIG. 3 is a flowchart illustrating a first method suitable for designing a health management system such as that shown in FIG. 2.

Step 305 in FIG. 3 comprises identifying the sensors required to obtain the necessary raw data from the platform sub-systems. For example, the type, configuration, location and data output format of the sensors may be identified in this step. At step 315, the sensors layer 210 is populated by recording the identified sensors 224. Connectors 214 are then inserted to link each sensor with its respective sub-system.

At step 306, the data handling procedures are designed. These are the procedures that are necessary to convert the raw output data from the sensors 224 in the sensors layer 210 to the data specified by the data requirements identified in the data requirements layer 206. These data transformation procedures are recorded in the data transformation layer 208 at step 316.

Data Transformation Layer

The data transformation layer 208, populated with the procedures designed in step 306 of FIG. 3, will now be explained in more detail.

A data handling procedure within the data transformation layer 208 describes how the raw output data of the sensors layer 210 is converted to the data required by the data requirements layer 206.

Broadly, a data handling procedure may include one or more of the following processes, namely: transferring data; storing data; and transforming data.

Transferring data comprises moving data from one part of the health management system 200 to another, for example by transferring the data across a communications bus, through a data link, via a network or the internet, or using a data storage medium. Data transfer could also take place by manually transferring information from one individual or entity to another.

Transferring data encompasses on-board data transfer (i.e. transfer of data within the platform), and off-board data transfer (i.e. transfer of data from the platform to another entity, or transferring platform-related data between two non-platform entities). It will be appreciated that, when designing a data handling procedure involving transferring data, the nature of the transfer and the rate at which the transfer occurs must be taken into account.

Data storage typically comprises writing data to a storage medium such as a memory or a database. Examples include storing raw sensor data or processed data to a data storage medium for later analysis and writing data to a memory buffer for taking time averages or recording a rapid, transient event.

Data transformation processes involve performing calculations on data or applying an algorithm to the data. A simple example of a data transformation process is comparing a value from a data stream or time series with a stored threshold value to generate a logical output. A more complex example would be tracing an operating locus for a sub-system through a multi-dimensional look-up table. Data transformation processes may also include combining two different sources of data in order to increase the information content of a data stream.

Figure 4:
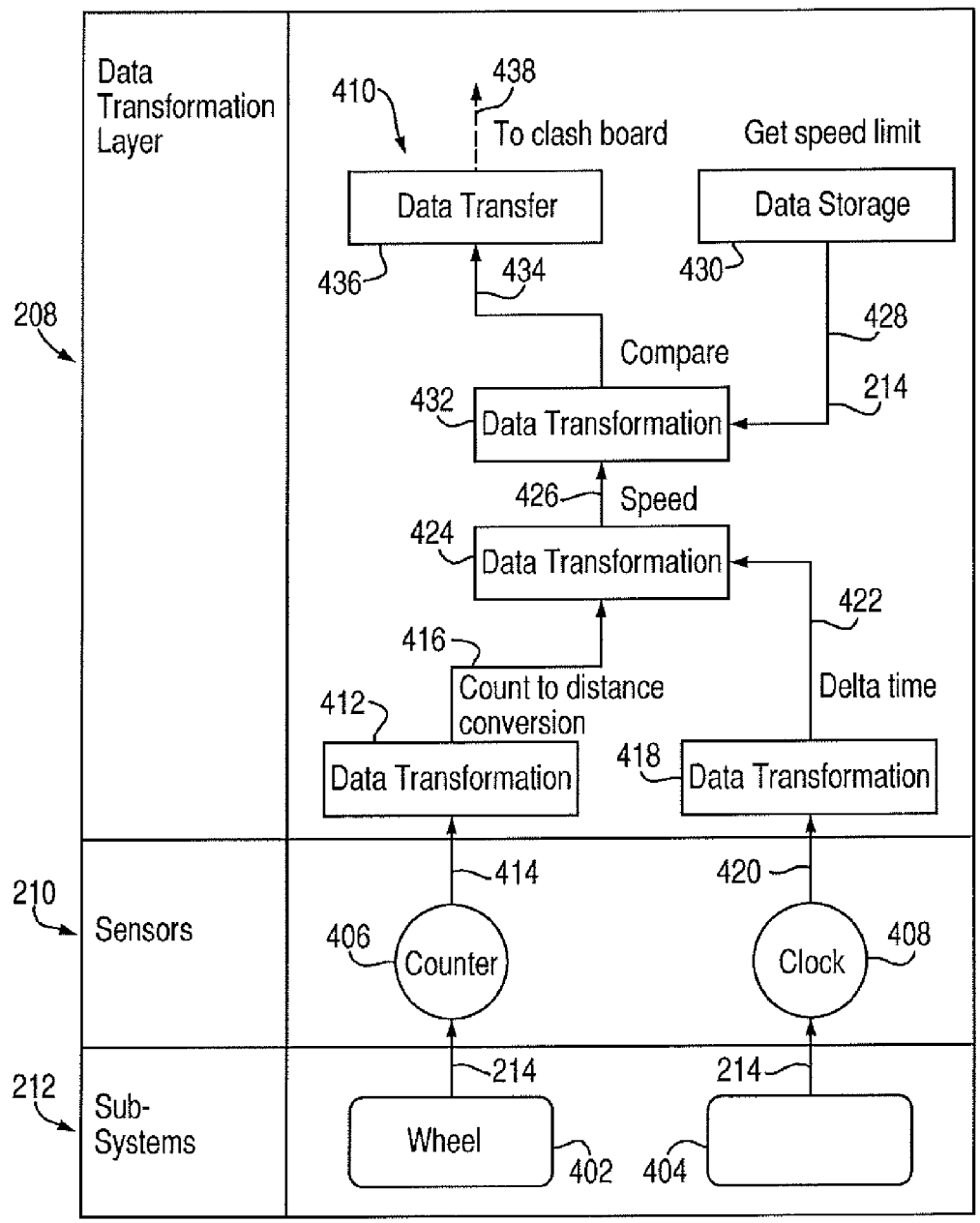
FIG. 4 is a schematic diagram showing part of the health management system of FIG. 2 in more detail.

A simple example of a data handling procedure within the data transformation layer 208 is shown in FIG. 4 by way of illustration only. In this example, the platform is an automobile, and the secondary sub-system is a speed-monitoring system. The stakeholder of interest is the driver of the automobile, and the information requirement is whether the driver is operating the vehicle within safe limits. The corresponding data requirement is whether the vehicle is being driven at a speed that exceeds a pre-defined speed limit. Although the stakeholders, information requirements and data requirements levels are not shown in FIG. 4 for clarity, it will be understood that these levels would contain appropriate blocks representing the respective entity or information.

The sub-systems layer 212 comprises a sub-system block 402 representing a wheel of the automobile, and a further sub-system block 404 representing a generic processor, such as an electronic control unit of the automobile.

The sensors layer 210 is populated with a counter sensor 406 that is connected to the wheel 402 by a connector 214 and is arranged to output data corresponding to the number of revolutions that the wheel 402 undergoes. For example, the raw output data from the counter sensor 406 could be a series of pulses, each pulse corresponding to one full revolution of the wheel 402. The sensors layer 210 also includes a clock sensor 408, which is connected to the processor by a further connector 214 and which outputs a signal at a known, fixed frequency based on a core frequency of the processor 404.

The data transformations layer 208 is populated with a data handling procedure, indicated generally at 410, which converts the raw sensor output from the counter sensor 406 and the clock sensor 408 to a form that satisfies the data requirement, i.e. an indication (such as a warning lamp) that illuminates when the automobile is exceeding the applicable speed limit.

The data handling procedure 410 receives output signals from the counter sensor 406 and the clock sensor 408. A first data transformation process 412 converts the output signal 414 of the counter sensor 406 to a distance 416, for example by multiplying the number of pulses in the output signal 414 by the known circumference of the wheel 402. A second data transformation process 418 converts the output signal 420 of the clock sensor 420 to a time interval 422.

A third data transformation process 424 receives the distance information 416 and the time interval 422 and converts these to an operating speed 426, by dividing the distance information 416 by the time interval 422.

A pre-defined speed limit 428 is recalled from a data storage medium 430, such as a memory, and the speed limit information 428 is compared with the operating speed 426 in a fourth data transformation process 432. The fourth data transformation process 432 outputs a logical value 434 that captures whether or not the pre-defined speed limit 428 is being exceeded.

Finally, a data transfer process 436 converts the logical output 434 of the fourth data transformation process 432 into an output signal 438 that can be used to generate a warning signal on a dashboard of the automobile if the pre-defined speed limit is being exceeded, thereby satisfying the data requirement and, accordingly, satisfying the stakeholder's information requirement.

As can be understood from FIG. 4, the data handling procedure is represented in the data transformation layer 208 of the secondary sub-system by a plurality of blocks representing data transfer processes 436, data storage processes 430, and data transformation processes 412, 418, 424, 436, interconnected by connectors 214 representing signals, data outputs, and information flows 414, 416, 420, 422, 426, 428, 434, 438.

Design Tool

As will be apparent from the above description, the way in which the health management system 200 is structured means that the process of designing the system 200 can be optimised in terms of efficiency and information use. In particular, the structure demands that the information necessary to design the system 200 is harvested in an efficient and logical manner.

Accordingly, the method shown in FIG. 3 can be implemented as a software tool for designing a health management system or other secondary sub-system of a platform. As noted above, the structure of the health management system 200, as illustrated in FIG. 2, can be used as the basis of a graphical user interface for the design tool, such that the designer of the health management system 200 is prompted to populate each of the layers 202, 204, 206, 208, 210, 212 as explained with reference to FIG. 3.

Decomposition of Information and Data Requirements

Figure 5:
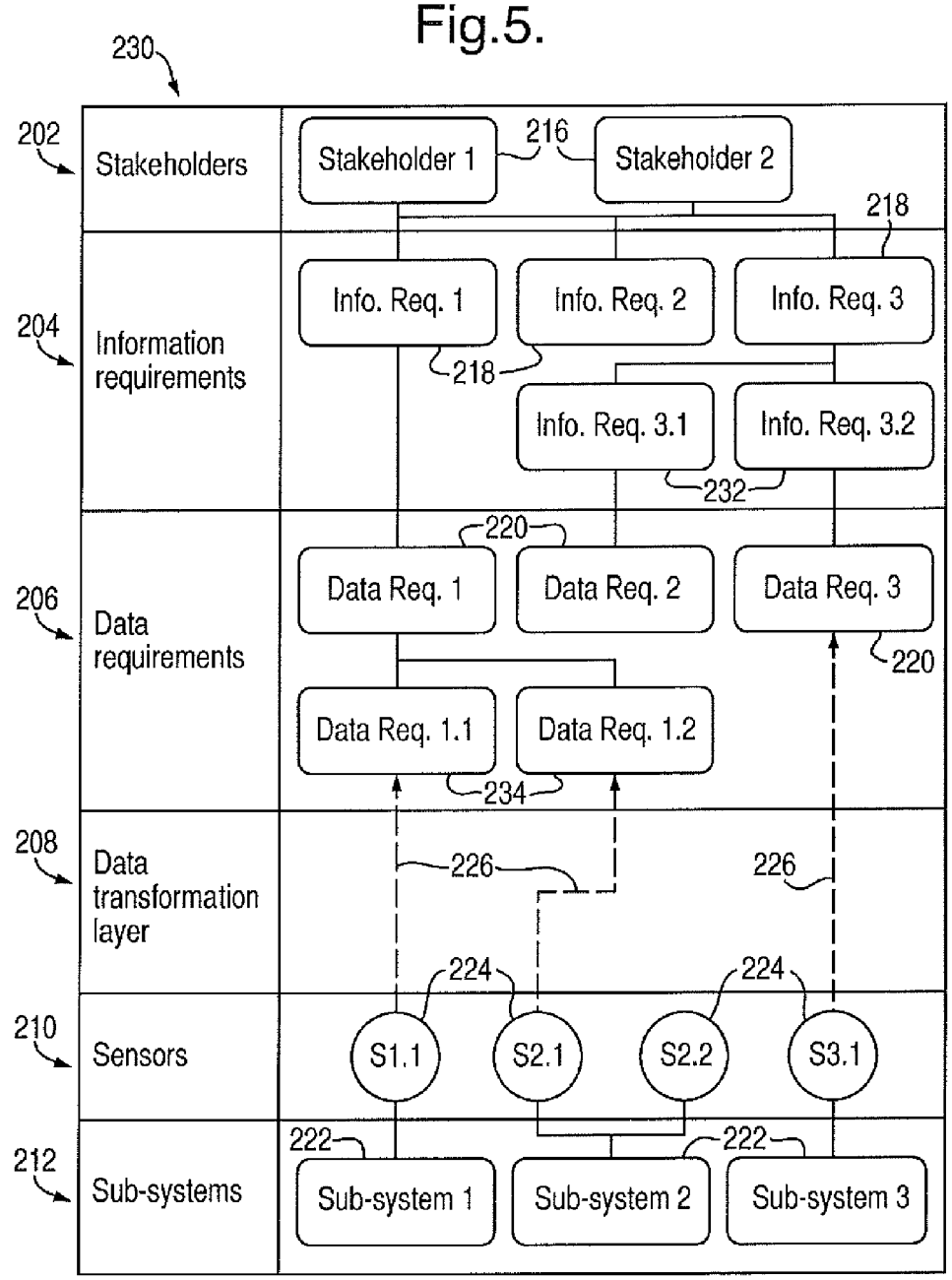
FIG. 5 is a schematic diagram of a second embodiment of a heath management system.

FIG. 5 shows, schematically, a second embodiment of a secondary sub-system for monitoring the condition of a platform, in the form of a health management system 230. As for FIG. 2, FIG. 5 represents the structure of the health management system 230, and again can also be considered as a schematic representation of a graphical user interface of a design tool used to design the health management system 230.

The health management system 230 of the second embodiment has the same hierarchical structure as the first embodiment shown in FIG. 2, and like reference signs are used in FIG. 5 to denote like features.

The health management system 230 of FIG. 5 differs from the first embodiment shown in FIG. 2 in that the information requirements layer 204 and the data requirements layer 206 can each contain a hierarchical structure of requirement blocks 218, 220.

In the FIG. 5 example, the information requirements layer 204 includes an information requirement block 218 denoted Info. Req. 3, which represents a top-level information requirement identified by consideration of the stakeholders. Two subsidiary information requirement blocks 232, denoted Info Req. 3.1 and Info. Req. 3.2, are connected to the Info. Req. 3 block 218, and represent sub-requirements of the top-level information requirement, which are necessary to decompose the top-level information requirement into one or more corresponding data requirements.

More specifically, the Info. Req. 3 block 218 represents a piece of information in a form that is required by a stakeholder. However, fulfilment of this top-level information requirement itself requires two pieces of information, represented by the subsidiary blocks 232. Each of these subsidiary blocks 232 represents a piece of information that can be satisfied by a corresponding data requirement, represented in FIG. 5 by the data requirement blocks 220 labelled Data Req. 2 and Data Req. 3.

Similarly, in FIG. 5 the data requirements layer 206 comprises top-level data requirement blocks 220, one of which (labelled Data Req. 1) is connected to two subsidiary data requirements blocks 234 (labelled Data Req. 1.1. and Data Req. 1.2).

The Data Req. 1 block 220 represents a piece of data that is required to satisfy the information requirement in the level above (represented by the block 218 denoted Info Req. 1 in this example), while the subsidiary data requirement blocks 234 represent two different pieces of data that must be combined to satisfy the top-level data requirement. In this example, the two subsidiary data requirements require data from two different sub-systems of the platform. Consequently, the subsidiary data requirements blocks 234 are connected, via the data transformation layer 208, to two different sensors 224 denoted S1.1 and S2.1, which are respectively connected to two different sub-system blocks 222, denoted Sub-system 1 and Sub-system 2.

In this way, an identified information requirement or data requirement can be decomposed into one or more sub-requirements, so as to capture details of how information requirements and data requirements can be satisfied within the health management system 230.

By way of example, a vehicle hire company may wish to equip each vehicle in its fleet with a secondary sub-system that monitors the condition of the vehicle in the context of how the hirer of the vehicle treats it.

In this case, the secondary sub-system would include, in the stakeholders layer 202, a stakeholder being a site fleet manager. In the information requirements layer 204, this stakeholder's top-level information requirement is to be able to identify abuse of a vehicle by a customer. This information requirement can be resolved into two subsidiary information requirements, namely to be able to capture abuse of the vehicle whilst it is being operated, and to be able to capture abuse of the vehicle while it is stationary.

To satisfy the subsidiary information requirement of capturing abuse of the vehicle whilst it is being operated, the data requirements layer 206 includes a top-level data requirement comprising an answer to the question: has the vehicle been driven at excessive speed? This top-level data requirement can be broken down into two subsidiary data requirements, namely the answers to the questions: has the vehicle exceeded the local speed limit by more than 10%; and: has the vehicle exceed 75 mph for more than 15 seconds? Each of these subsidiary data requirements can be satisfied using similar logic to that described with reference to FIG. 4.

To satisfy the subsidiary information requirement of capturing abuse of the vehicle whilst it is stationary, the data requirements layer 206 includes a top-level data requirement comprising the answer to the question: has the vehicle suffered high impacts whilst stationary? This data requirement can be satisfied from accelerometer sensors on the vehicle.

Use Layer

Figure 6:
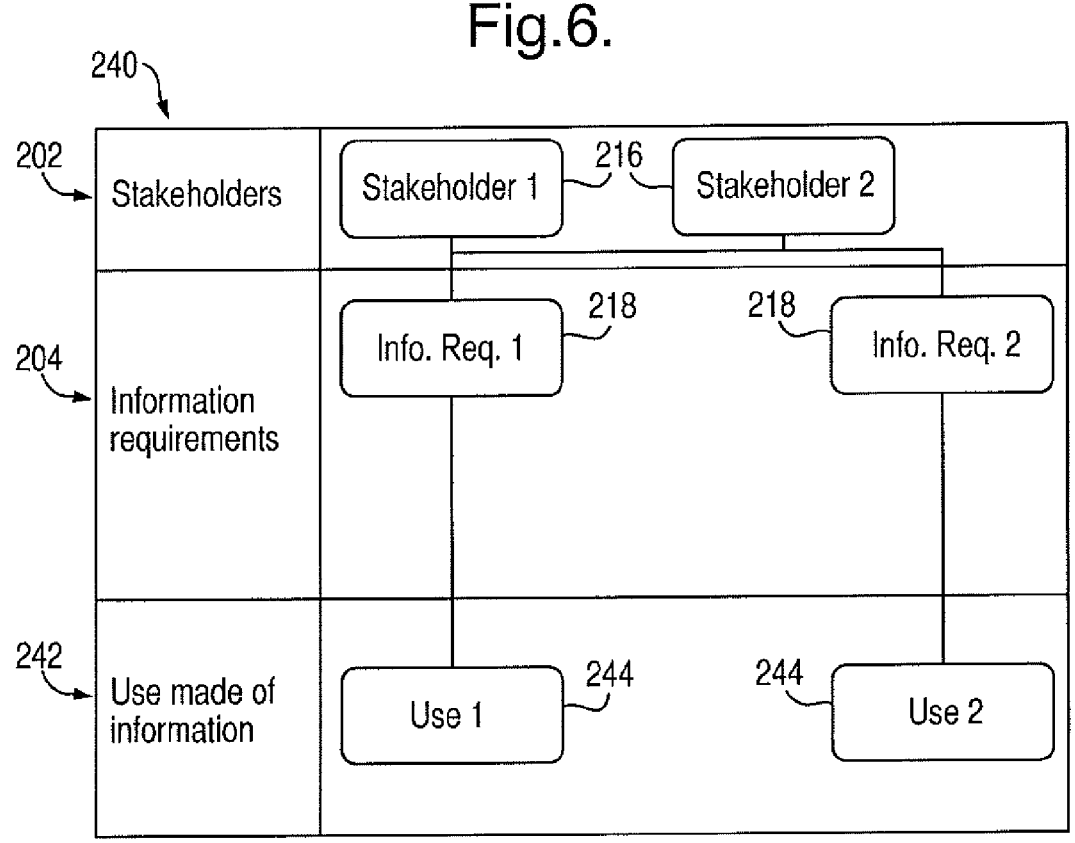
FIG. 6 is a schematic diagram of part of a third embodiment of a health management system.

FIG. 6 shows, schematically, part of a third embodiment of a secondary sub-system for monitoring the condition of a platform, in the form of a health management system 240. In this embodiment, as in previous embodiments, the health management system 240 comprises a hierarchical structure of stakeholders, information requirements, data requirements, data transformation, sensors and sub-systems layers (such as shown in FIGS. 2 and 5). Only the stakeholders layer 202 and the information requirements layers 204 are shown in FIG. 6.

This third embodiment includes an additional information use layer 242, which lies outside the hierarchical structure and parallel to the data requirements layer, so as not to disrupt the top-to-bottom flow of data through the hierarchical layer structure of the health management system 240.

The use layer 242 comprises a plurality of use blocks 244, each use block 244 being connected to an information requirement block 218 in the information requirements layer 204. Each use block 244 represents a piece of information concerning the intended use of the information requirement with which it is associated. This intended use information may, for example, describe why the information specified in the information requirement is needed, and for what purpose the required information will be used by the stakeholder. The use layer 242 would be populated as part of capturing the information requirements of the stakeholders (for example at step 302 of the method outlined in FIG. 3).

The provision of the use layer 242 is advantageous, because it allows the designer of the health management system 240 to validate the captured information requirements, facilitating the omission of redundant information requirements and thereby improving the efficiency of the health management system 240. Furthermore, presenting the intended use information for the captured information requirements assists the designer in populating the data requirements layer.

Methods Layer

Figure 7:
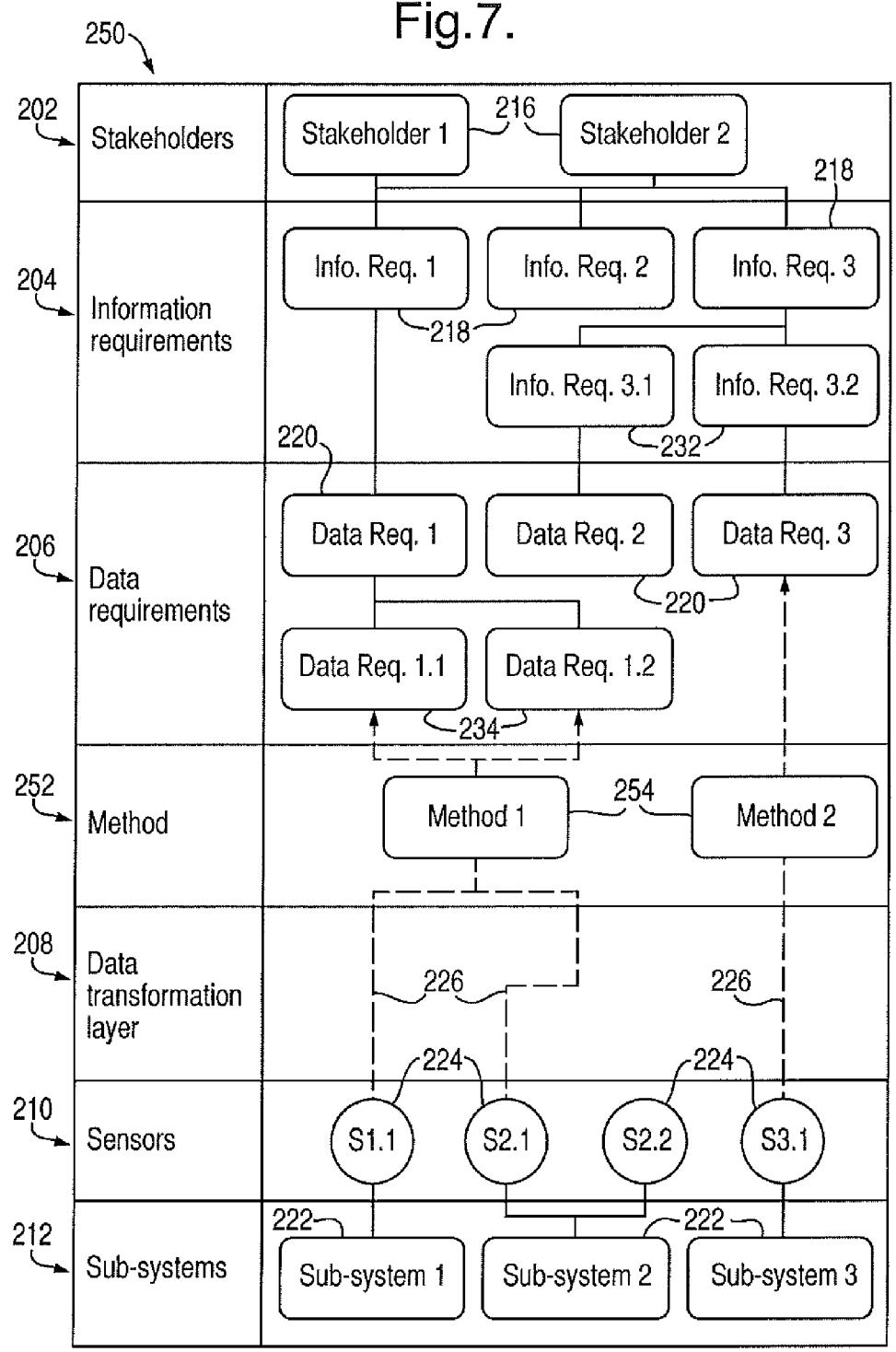
FIG. 7 is a schematic diagram of a fourth embodiment of a health management system.

FIG. 7 shows, schematically, a fourth embodiment of a secondary sub-system for monitoring the condition of a platform, in the form of a health management system 250. The health management system 250 of this embodiment is similar to the embodiment shown in FIG. 5. In this case, however, a methods layer 252 is included between the data requirements layer 206 and the data transformations layer 208.

The methods layer 252 includes method blocks 254, each of which is connected between one or more data handling procedures 226 in the data transformations layer 208 and one or more data requirement blocks 220, 234 in the data requirements layer 206. Each method block 254 represents a description of the method by which the information output from the sensors layer 210 is converted, by the or each data handling procedure 226 connected to the method block 254, to fulfil the data requirements represented by the data requirement blocks 220, 234 connected to the method block 254.

Said another way, each method block 254 makes available to a designer of the health management system 250 a simple description of the calculations required to convert one or more sensor outputs to one or more data requirements. Preferably, the description is in a natural language format, and conveniently comprises a classification of the method into one of several categories or types of data handling process. In this way, the data handling procedures associated with a particular method description can be archived in a database, allowing re-use of the methods in the design of other secondary sub-systems.

For example, when new data handling procedures are written to convert one or more sensor outputs to one or more data requirements, the new procedures can be archived in a database, with an attached method description. Each record could, for example, include the input data type, output data type and data processing algorithms of the data handling procedure 226. By making the database available for subsequent designs, the relevant archived data handling procedures can be recalled to avoid duplication of effort when the same or a similar data transformation is required. The method blocks 254 therefore improve the efficiency of the design process.

In the example of FIG. 7, the method block 254 denoted Method 1 is connected to two data handling procedures 226. The first of these procedures 226 is connected to a sensor 224, denoted S1.1, which is in turn connected to a first sub-system block 222 denoted Sub-system 1. The second data handling procedure 226 is connected to a sensor 224, denoted S2.1, which is connected to a second sub-system block 222 denoted Sub-system 2. The method block 254 is also connected to two data requirement blocks 234 denoted Data Req. 1.1 and Data Req. 1.2.

The method block 254 denoted Method 1 therefore contains a description of how the output signals of the sensors S1.1 and S2.1 are converted by the data handling procedures 226 into the data requirements represented by the data requirement blocks 234 denoted Data Req. 1.1 and Data Req. 1.2.

Similarly, the method block 254 denoted Method 2 contains a description of how the output signal of the sensor 224 denoted S3.1 is converted into the data requirement represented by the data requirement block 234 denoted Data Req. 3.

Multiple Methods

Figure 8:
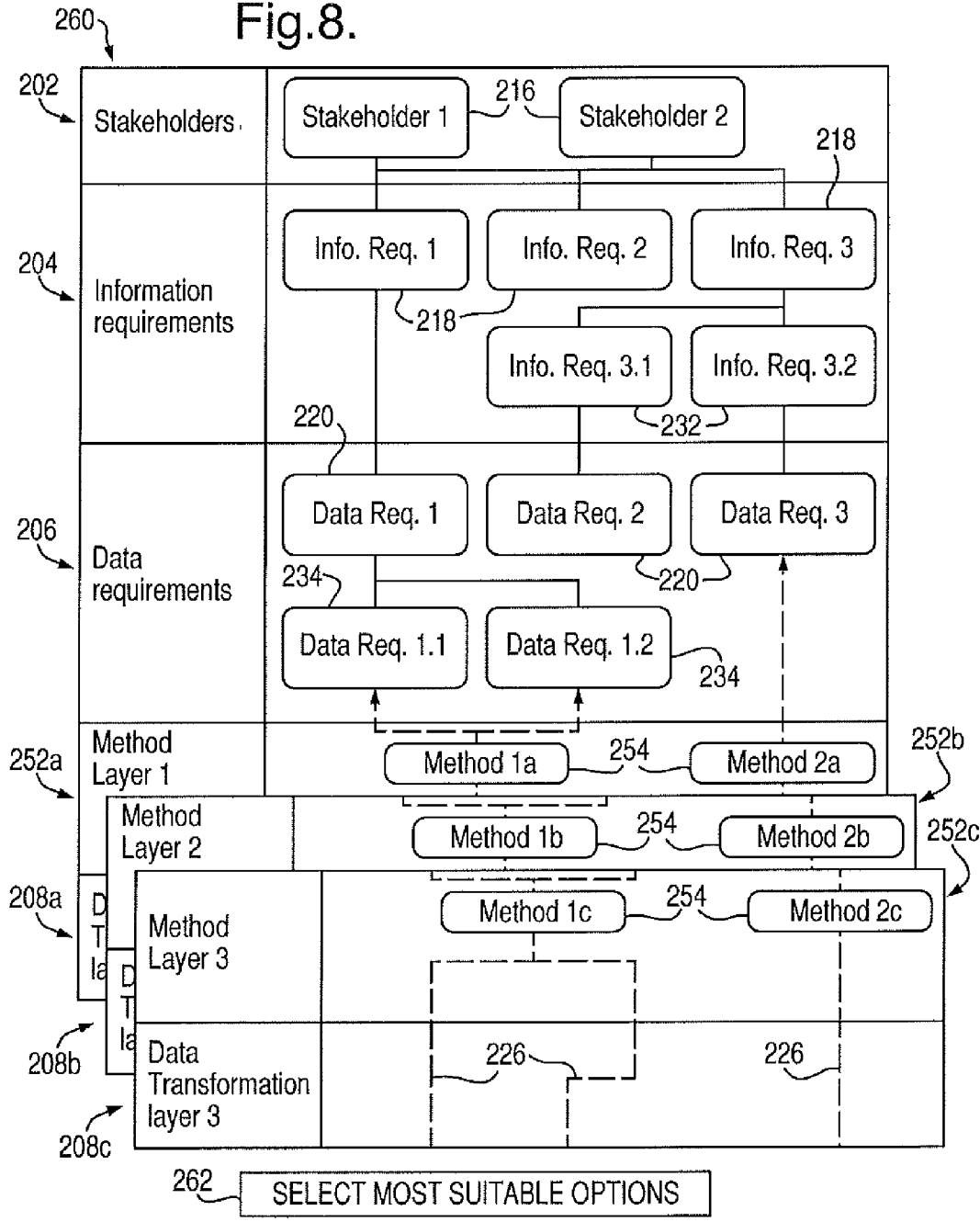
FIG. 8 is a schematic diagram of a fifth embodiment of a health management system.

In some cases, more than one method may be available to fulfil a particular data requirement from the available output signals from the sensor layer 210. Accordingly, a fifth embodiment of a secondary sub-system for monitoring the condition of a platform is illustrated in FIG. 8. In this embodiment, there is provided a health management system 260 that is similar to the health management system 250 of the fourth embodiment shown in FIG. 7, except in that three parallel data transformation layers 208a, 208b, 208c are provided, along with three parallel methods layers 252a, 252b, 252c.

Each data transformation layer 208a, 208b, 208c and its associated methods layer 252a, 252b, 252c represents one of three possible options for converting the output signals available from the sensors layer 210 to the data requirements specified in the data requirements layer 206.

By way of example, and referring back to the situation illustrated in FIG. 4 in which it is necessary to calculate the current speed of an automobile, it will be appreciated that in a typical automobile there are several methods by which such a speed calculation could be performed.

For example, as in FIG. 4, the speed could be calculated using a sensor comprising a counter connected to a wheel of the automobile, and a clock. The corresponding calculations would be recorded as data handling procedures 226 in a first data transformation layer (208a in FIG. 8), and a suitable description of the method (for example "speed calculation using wheel counter") would be recorded in a corresponding first methods layer 252a.

The speed of the automobile could instead be calculated using a sensor comprising a counter connected to a driveshaft of the automobile, and a clock. The calculations required for this method, and a corresponding description, would be recorded in a second data transformation layer 208b and an adjacent second methods layer 252b, respectively.

In yet another alternative, the speed of the automobile could be calculated using a global positioning signal (GPS) sensor attached to a navigation sub-system of the automobile, and a clock. The calculations required for this method, and a corresponding description, would be recorded in a third data transformation layer 208c and an adjacent third methods layer 252c, respectively.

By capturing more than one method of fulfilling a data requirement in parallel methods layers 252a, 252b, 252c and parallel data transformation layers 208a, 208b, 208c, the designer of the health management system 260 can compare the various options and decide on an appropriate option based on suitable factors. For example, such factors may include the reliability and accuracy of the different data sources, the robustness of the different algorithms, the noise level on different data sources and so on.

Furthermore, the health management system 260 can be arranged to select the appropriate method from several options based on a real-time assessment of the optimum method at that instant. In the automobile speed example discussed above, for instance, the method using a GPS sensor might be most accurate and therefore used in preference to the other two methods when an adequate GPS signal is available, but the system 260 could be configured to switch to fulfilling the speed data requirement by one of the alternative methods when the GPS signal is low.

To this end, the health management system 260 includes a selection layer 262 arranged to select the most suitable method option by connecting the signal outputs from the sensor layer 210 to the appropriate data transformation layer 208a, 208b, 208c, corresponding to the method to be selected. The selection layer 262 can be designer-configurable, to allow the designer to select the most appropriate method during design of the health management system 260, user-configurable, to allow a user of the system 260 to switch between methods, and/or automatically configurable, so as to select automatically an appropriate method based on, for example, environmental condition data and sensor output levels.

Platform Environment

One important factor involved in determining the most appropriate or optimum method to be used is the platform environment. The platform environment includes external factors that act on the platform, such as exposure to rain, humidity, airborne contaminants, radiation, corrosive environments, extremes of temperature and pressure, and internal factors that are generated during operation of the platform itself, such as the extent of linear and rotational acceleration, vibration, changes in orientation, changes in position, noise generation, and so on.

Figure 9:
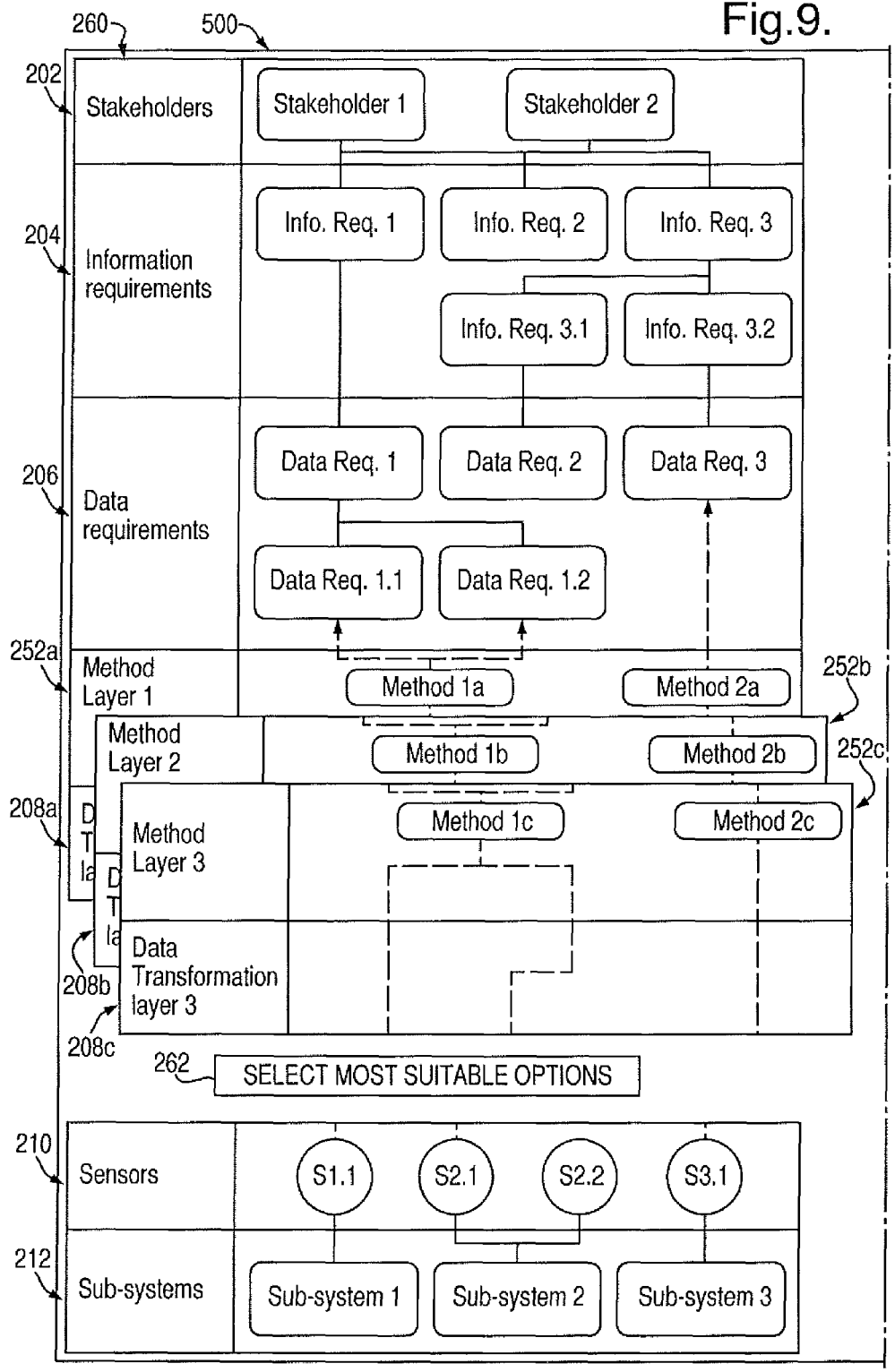
FIG. 9 is a schematic diagram illustrating a design tool for designing a health management system such as that shown in FIG. 8.
Figure 9:
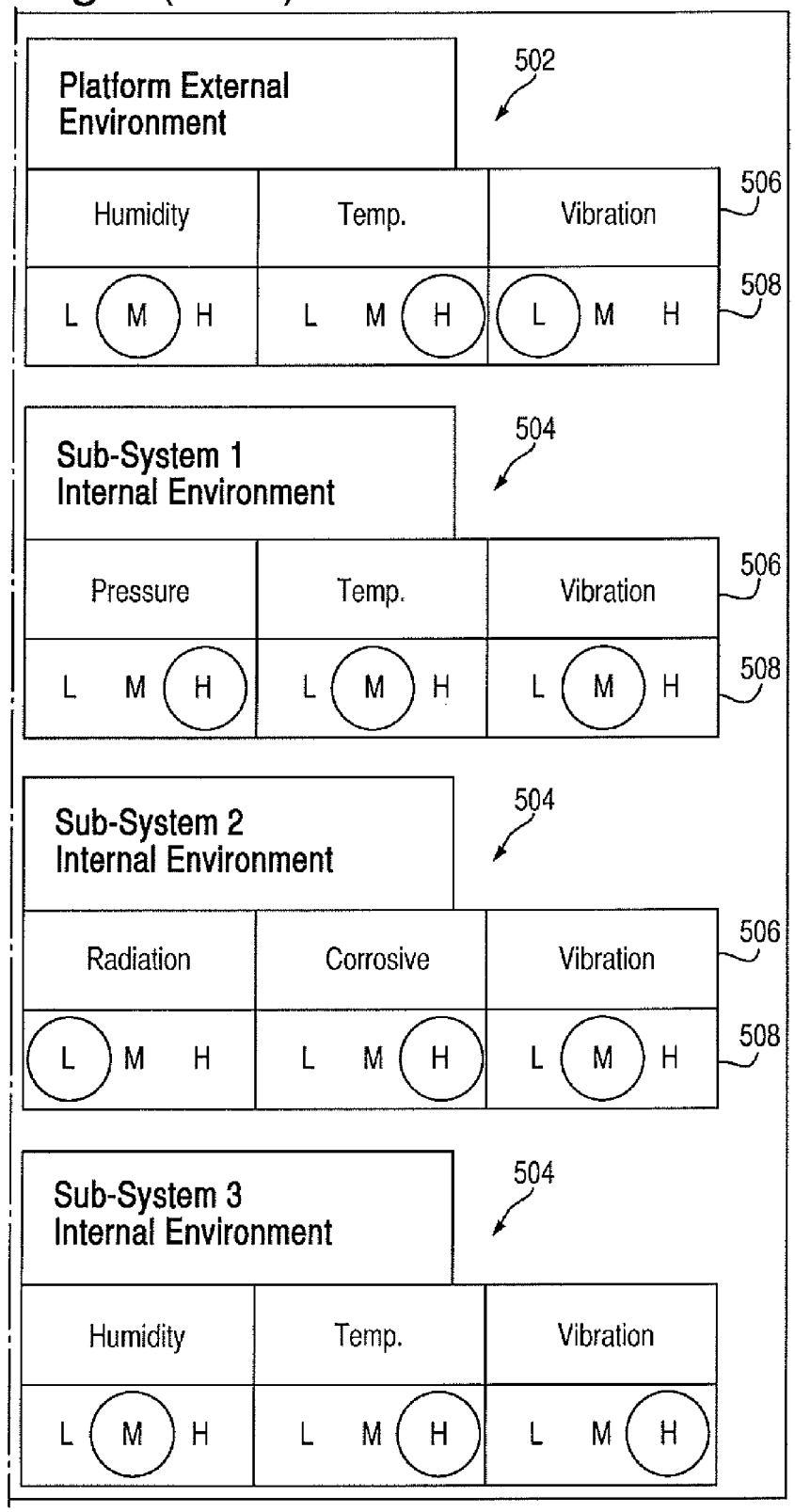

Accordingly, a design tool for a secondary sub-system for monitoring the condition of a platform, such as a health management system of the type shown in FIG. 8, can include means for capturing the platform environment, as illustrated in FIG. 9.

The graphical user interface of the design tool 500 includes a graphical representation of the health management system 260 alongside a plurality of environment fields 502, 504. Each environment field 502, 504 specifies, for a particular external or internal environment, one or more environment factors 506, each being associated with a user-selectable environment level 508.

The environment levels 508 classify each environment factor 506 as low (L), medium (M) and high (H). Classification at this relatively coarse resolution has been found to provide sufficient information to allow selection of the most appropriate method.

When populating the sub-systems layer 212 of the health management system 260, the designer is prompted to input the platform external environment by selecting an appropriate level 508 for each environment factor 506 in the platform external environment field 502. The selections are illustrated in FIG. 9 by the encircled classifications L, M, H. In the example shown in FIG. 9, the environment factors 506 in the external environment field 502 are humidity, temperature and vibration, but it will be appreciated that any appropriate external environment factors could be included in place of or in addition to those shown in FIG. 9.

Similarly, the designer is prompted by the design tool to input the internal environment of the platform on a sub-system by sub-system basis. To this end, a sub-system internal environment field 504 is provided for each of the sub-systems represented in the sub-systems layer 212 of the health management system 260. In the FIG. 9 example, three such sub-systems are illustrated. Each sub-system internal environment field 504 includes appropriate environment factors 506 for the respective sub-system, and the user can select the appropriate level 508 for each environment factor 506.

In some circumstances, the design tool 500 will include environment fields 502, 504 with pre-populated environment factors 506, where the relevant factors that influence a choice of methods is known. In other circumstances, the user will be prompted to populate the environment fields 502, 504 with environment factors 506 prior to selecting the levels 508 of each factor 506.

The environment information captured by the design tool 500 when the environment fields 502, 504 are populated can be stored in a database (not shown) of the design tool 500 and subsequently associated with each of the alternative methods once the methods layers 252a, 252b, 252c and associated data transformation layers 208a, 208b, 208c have been populated. Later, the environment information can be presented so as to assist the designer in evaluating the suitability of each of the alternative methods.

In this way, the provision of the environment fields 502, 504 in the design tool 500 advantageously links environment information with the parallel methods layers 252a, 252b, 252c so as to facilitate design of the selection layer 262.

Furthermore, the design tool 500 can be configured to select or recommend particular method options, based on the information provided by the designer when populating the environment fields 502, 504. For example, the design tool 500 can include, in a database (not shown), a look-up table of impact scores that provide a measure of the known effects of each environment factor 506 on known sensors of particular types, algorithms of particular types, and so on, according to the level 508 input by the user. In this way, the design tool 500 can calculate a cumulative or aggregate impact score for each alternative method, and either automatically select or indicate to the user that method which is most appropriate given the platform environment conditions.

Using the Design Tool

Use of the design tool 500 of FIG. 9 will now be described with reference to FIG. 10, which is a flowchart illustrating a method 600 of designing the health management system 260 of FIG. 8.

Figure 10:
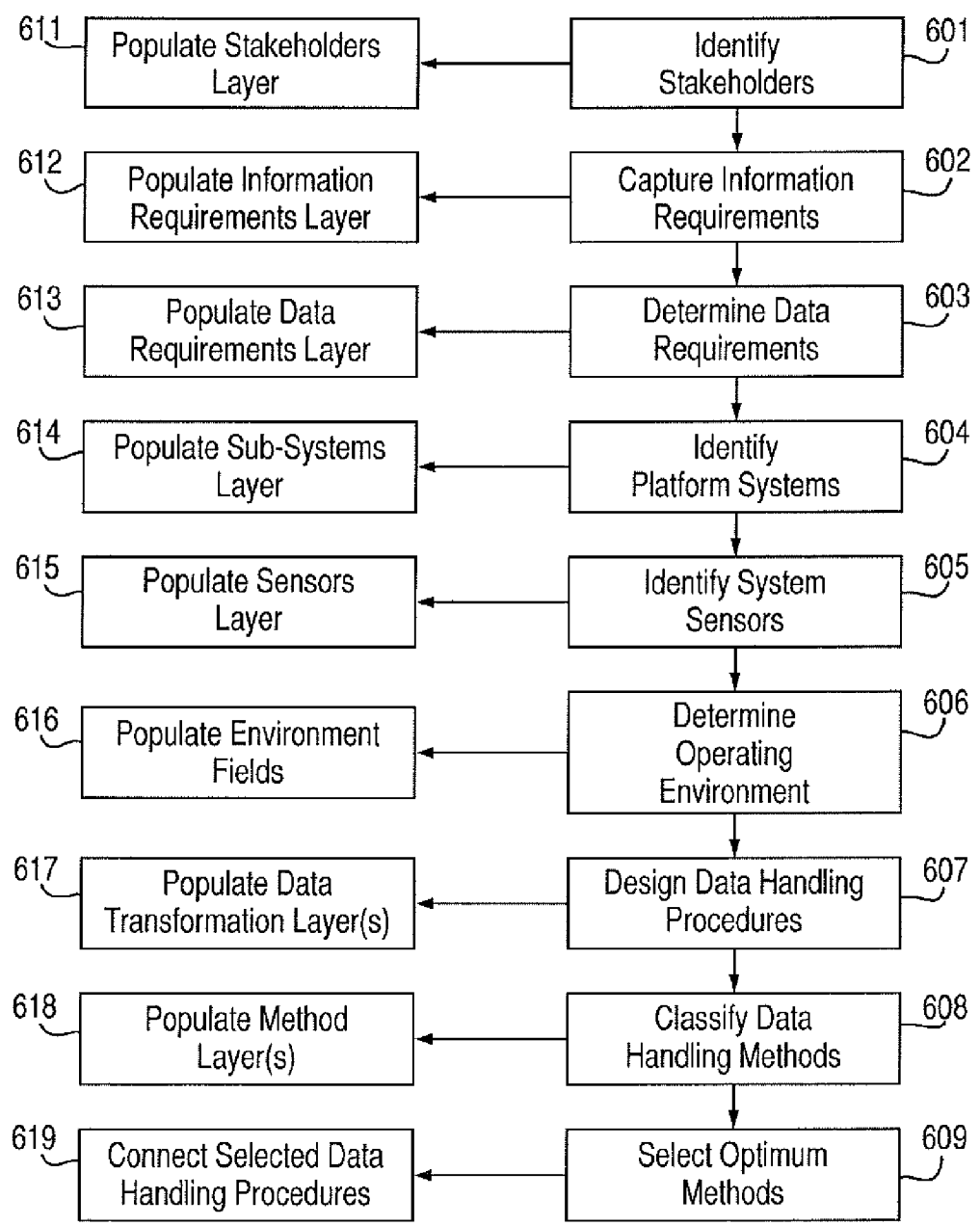
FIG. 10 is a flowchart illustrating a second method suitable for designing a health management system, such as that shown in FIG. 8.

The method 600 of FIG. 10 is similar to the method illustrated in FIG. 2, and comprises, at step 601, identifying the stakeholders, populating the stakeholders layer (step 611), capturing the information requirements (step 602), populating the information requirements layer (step 612), determining the data requirements (step 603), populating the data requirements layer (step 613), identifying the platform systems (step 604), populating the sub-systems layer (step 614), identifying the system sensors (615) and populating the sensors layer (step 615). Each of these steps is identical to the corresponding steps described with reference to FIG. 2.

The method 600 further comprises, at step 606, determining the operating environment of the platform and its sub-systems. This step may, for example, involve a designer of the system analysing the platform sub-systems identified in step 604 and assessing the significant internal environmental factors that could affect the sub-system, as well as the external environmental factors that act on the platform as a whole.

At step 616, the environment fields (as shown at 502, 504 in FIG. 9) are populated using the information generated from the assessment of environment factors.

At step 607, the data handling procedures are designed, and at step 617, the data transformation layer is populated with the data handling procedures. These steps are the same as those described with reference to FIG. 3, except in that a plurality of data handling procedures may be provided to fulfil the same data requirement. In such a case, in step 617, several parallel data transformation layers are populated, as described with reference to FIG. 8.

At step 608, the data handling methods embodied by the procedures designed in step 607 are classified. This involves providing a description or classification of each data handling method, as described with reference to FIG. 7 above. The descriptions or classifications are used to populate the methods layer, at step 618. Where a plurality of alternative data handling methods have been designed to fulfil a data requirement, several parallel methods layers are populated, as described with reference to FIG. 8.

At step 609, the optimum data handling methods of those available are selected (in cases where more than one data handling method has been identified to fulfil a data requirement). As described above with reference to FIG. 9, the information captured in the environment fields in step 616 is presented to the designer and/or used by the design tool to aid selection of the optimum methods based on the platform environment.

Finally, having selected the optimum methods, the data handling procedures associated with the selected methods are connected in an appropriate way to the corresponding sensors and, via the method blocks, to the corresponding data requirements blocks, so as to complete the design of the health management system 260 with information flows from the sub-systems layer 212 to the stakeholders 202.

Figure 11:
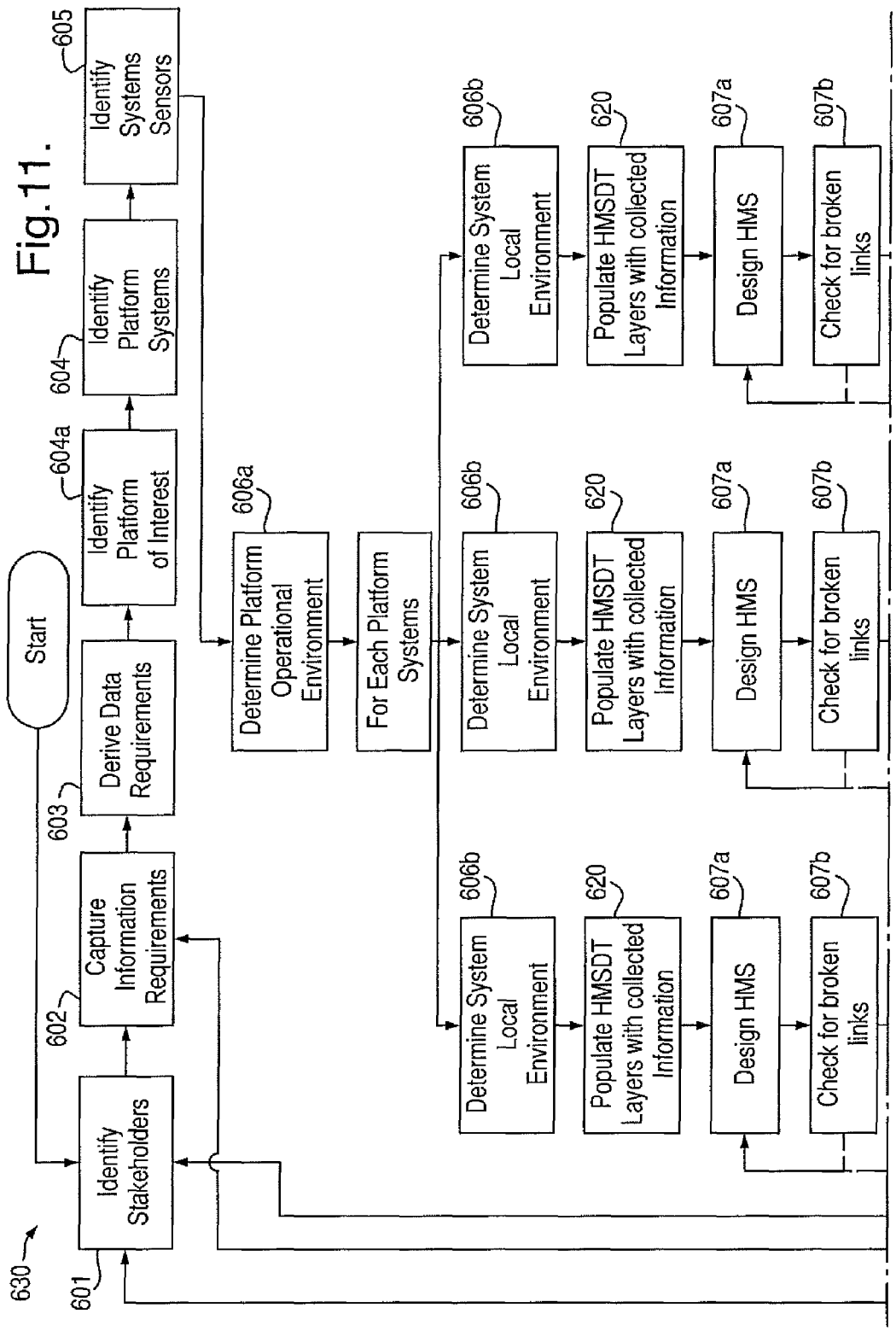
FIG. 11 is a flowchart illustrating a third method suitable for designing a health management system, such as that shown in FIG. 8.
Figure 11:
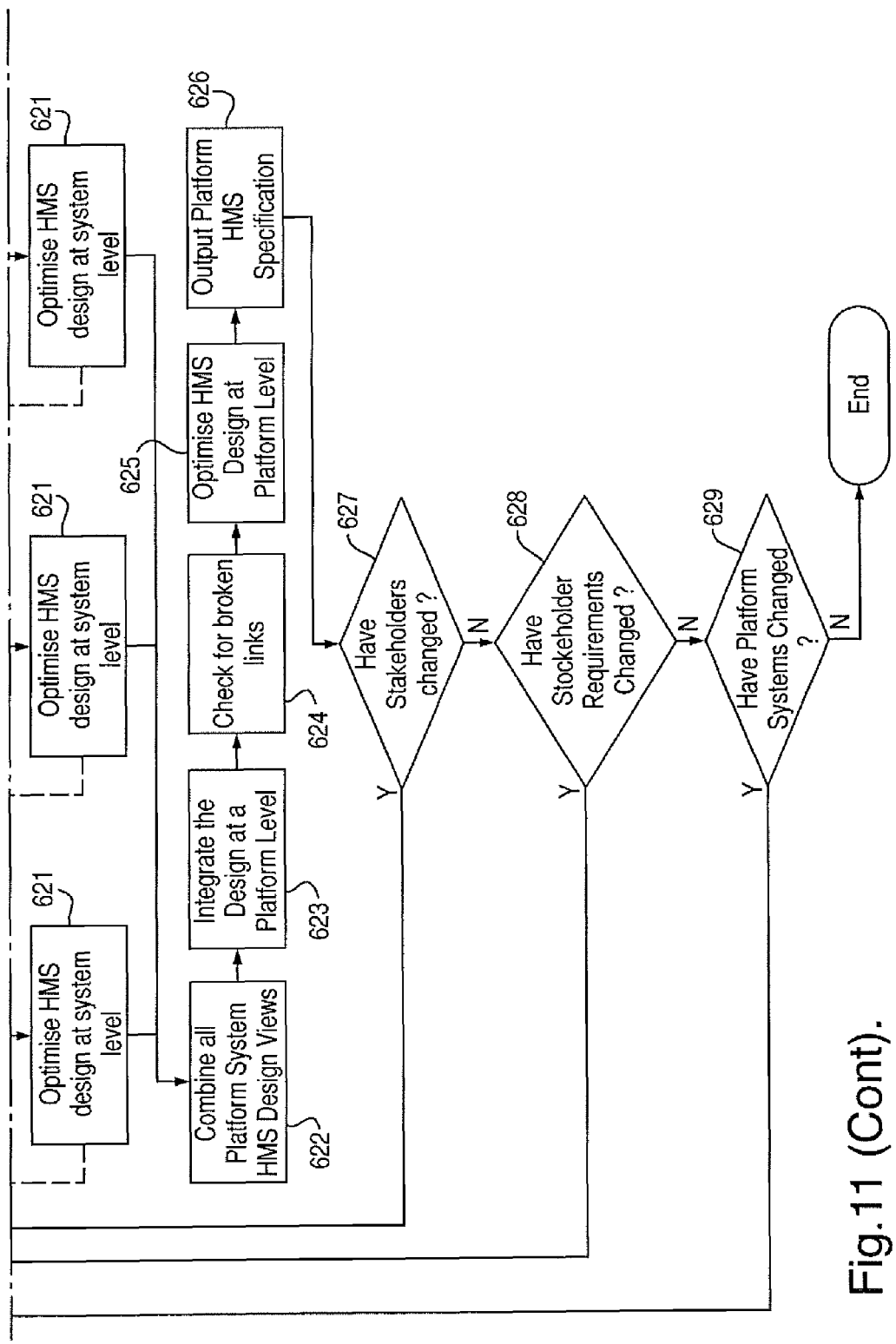

FIG. 11 is a flowchart illustrating a further method 630 for designing a health management system such as that shown in FIG. 8, using a design tool such as that shown in FIG. 9. The method 630 illustrated in FIG. 11 includes aspects of the method of FIG. 10, along with additional steps. Where steps in the method of FIG. 11 correspond to steps in the method of FIG. 10, like reference numerals have been used.

As in FIG. 10, the method 630 starts by identifying the stakeholders (step 601 in FIG. 11), capturing the information requirements of the stakeholders (step 602), and deriving or determining the data requirements (step 603) corresponding to the information requirements.

Once the data requirements have been determined, the platform of interest is identified (step 604a). In some cases, this step will be trivial, since the platform of interest is simply the platform for which the health management system is being designed. However, in complex situations involving many interacting platforms, it may be necessary to identify the platform of interest by assessing which platform gives rise to the data required by the data requirements.

Having established the platform of interest, the platform sub-systems that give rise to data capable of fulfilling the data requirements are then identified at step 604 and, at step 605, suitable sub-system sensors are identified.

In the method 630 of FIG. 11, the step of determining and assessing the environment factors in the method 600 of FIG. 10 (step 606 in FIG. 10) is split into two sub-steps. In a first sub-step (step 606a in FIG. 11), the operational environment of the platform, as a whole, is determined. In a second sub-step (step 606b), the local operating environment of each sub-system is determined.

When using the design tool illustrated in FIG. 9, for example, the information required to populate the platform external environment field 502 would be determined in the first sub-step 606a, and the information required to populate the sub-system internal environment fields 504 would be determined in the second sub-step 606b.

Starting with step 606b, the method proceeds by considering, independently, the design of each part of the system associated with each identified sub-system of the platform. By adopting this modular approach, the design process is more manageable and simpler than if the design of the whole system were contemplated at this stage.

At step 620, the stakeholders layer 202, information requirements layer 204, data requirements layer 206, sensors layer 210 and sub-systems layer 212, as well as the environment fields 502, 504, of the health management system 260 are populated in the design tool 500 using the information determined in steps 601 to 606b. Thus step 620 in the method 630 of FIG. 11 incorporates steps 611 to 616 of the method 600 of FIG. 10.

At steps 607a and 607b, the data handling procedures that form the part of the health management system associated with the sub-system under consideration are designed. Steps 607a and 607b will be explained in more detail below but, briefly, step 607a comprises selecting or designing appropriate procedures for converting output signals from the sensors in the sensor layer 210 to a form suitable for fulfilling the data requirements specified in the data requirements layer 206 and populating one or more data transformation layers accordingly, as previously described. Although not shown explicitly in FIG. 11, step 607a may also include the steps of classifying the data handling methods, populating one or more methods layers, and selecting the optimum data handling methods based on environment factors as described above with reference to FIG. 10.

Step 607b comprises performing a check for broken links between the various blocks in the layers of the health management system 260 so as to verify the integrity of the design. Again, at this stage, the check of step 607b is performed independently on each part of the health management system associated with a particular sub-system.

The design of each part of the system associated with the sub-system under consideration is then optimised (step 621). The optimisation step 621 involves assessing the net attributes associated with fulfilling the information requirements of the stakeholders, such as the resource usage of the sensors required and the net accuracy and reliability of the information obtained, and will be described in greater detail below.

Having independently designed and optimised parts of the health management system associated with each identified sub-system, each part is then combined, at step 622, into a single view in the design tool.

FIG. 12 illustrates a design tool at this intermediate stage, wherein the parts or modules 690a, 690b, 690c of a health management system designed in steps 601 to 621 of FIG. 11 are shown side-by-side in a single view.

Each module 690a, 690b, 690c comprises a populated stakeholders layer 202, an information requirements layer 204, a data requirements layer 206, a methods layer 252, a data transformation layer 208 and a sensors layer 210, for example as previously described with reference to FIG. 7. However, unlike in FIG. 7, the sub-systems layer 212 of each module 690a, 690b 690c is populated with a single sub-system block 222a, 222b, 222c, denoted Sub-system 1, Sub-system 2 and Sub-system 3 respectively.

Subsequently, at step 623, the design of the system is integrated. The integration step 623 comprises combining identical blocks in each of the layers, retaining all of the connections between blocks except duplicate connections.

At step 624, a further check for broken links is performed on the integrated system design.

At step 625, a further optimisation step 621 is carried out, so as to optimise the design of the system as a whole.

At step 626, the specification of the health management system, on a platform level, is output from the design tool. The specification can be output in any suitable format, and may, for example, include a computer program for performing the data handling procedures in the health management system.

Post-Design Steps

It is advantageous to provide means by which the health management system or other secondary sub-system can accommodate changes that can occur to the platform both during its initial design and throughout its service life. In a legacy platform, such changes may, for example, comprise an upgrade of the platform to utilise new technology or increase capability. Changes in the way the platform is operated or supplied could also be important for a health management system. For example, when a platform is supplied to a customer through an availability contract rather than a conventional sales contract, the platform's health management system may encompass different stakeholders with different information requirements.

Accordingly, the method 630 of FIG. 11 includes several post-design steps, which are directed towards ensuring that the design of the health management system remains useful during changes to the platform, for example during development and testing of a new platform or upgrading or updating of a legacy platform during its operational life.

Following a change in a platform, it is first determined, at step 627, whether the stakeholders in the platform have changed. For example, a new stakeholder may have been added, or an existing stakeholder may have been removed. If the stakeholders have changed, the method 630 is performed again starting from the step of identifying the revised stakeholders (step 601), and then identifying the corresponding information requirements (step 602). It will be appreciated that the design process need only be performed in respect of any new information requirements or any information requirements that are no longer required.

If it is determined that the stakeholders have not changed, the information requirements of the stakeholders are then checked (step 628). If the information requirements have changed, the method 630 is performed again starting at step 602, in which new or redundant information requirements will be identified.

Finally, if neither the stakeholders nor their information requirements have changed, it is determined (at step 629) whether the platform sub-systems have changed. If so, the method 630 is performed again starting with identifying stakeholders (step 601). It is to be noted that it is necessary to perform steps 601 to 603 in this case, because the removal, addition or substitution of a platform system may give rise to changes in the stakeholders, information requirements, and data available from the platform.

When removing a stakeholder or a sub-system, it may be possible to remove blocks in other layers which are not connected to remaining stakeholders or sub-systems.

Designing Data Handling Procedures

The step 607a of designing the data handling procedures will now be described in more detail with reference to FIG. 13, which is a flowchart detailing the steps involved in the design process 607a.

Following step 620 of the method 630, the data requirements layer 206 and the sensors layer 210 are populated in the design tool with blocks corresponding to the respective pieces of data required to fulfil the information requirements of the stakeholders, and the sensors available in the sub-systems from which that data can be sourced. Consequently, step 607a involves connecting, via data handling procedures in one or more data transformations layers 208a, 208b, 208c, the data requirements to the sensors such that each data requirement is fulfilled.

Figure 13:
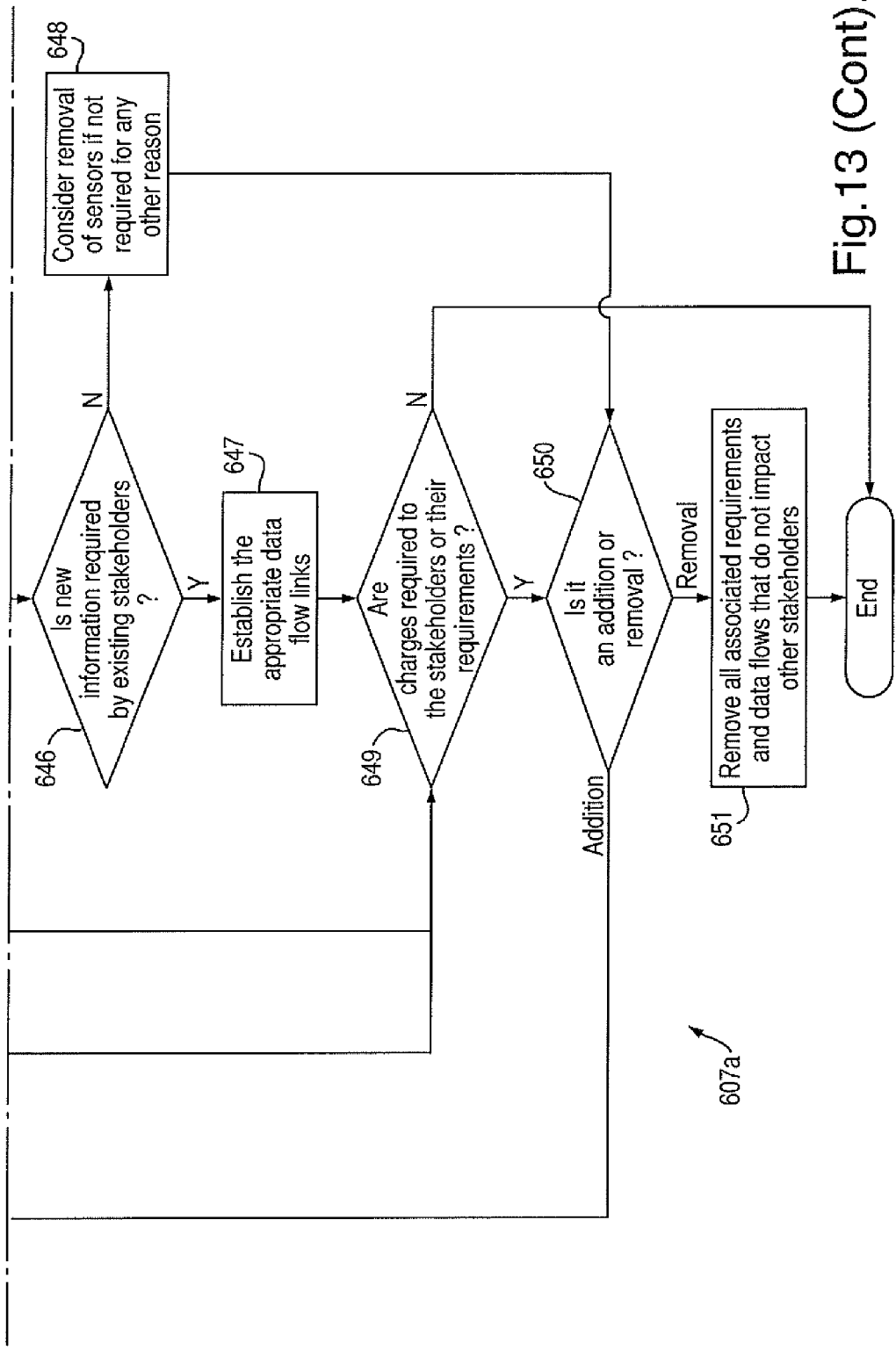
FIG. 13 is a flowchart illustrating, in greater detail, a design step of the method shown in FIG. 11.

The process of designing the data handling procedures starts, at step 640 in FIG. 13, with analysing which of the data requirements (and consequently the information requirements of the stakeholders, denoted 'stakeholder requirements' in FIG. 13) can be met using data from the existing sensors in the sensors layer 210. When a data requirement can be met by data from one or more existing sensors, a suitable data handling procedure is recorded in the data transformations layer 208a, 208b, 208c to link the data requirement block to the corresponding sensors.

By performing such a 'top-down' analysis, the design process identifies any existing sensors that can be used in the health management system in addition to an existing purpose, thereby increasing the efficiency of the platform.

The design is then analysed, at step 641, to determine if all of the data requirements, and consequently the information requirements of the stakeholders, are met using data from the existing sensors.

If the data requirements are not so met, then, at step 642, new sensors that are required to meet the remaining data requirements are identified, and again suitable data handling procedures are recorded in the data transformations layer 208a, 208b, 208c.

Step 642 thus advantageously identifies missing sensors in the platform.

By performing steps 640 to 642, links are created between all of the data requirements and the sensors needed to provide the corresponding data. At step 643, any sensors that are present in the platform but that are not connected to a data requirement are identified.

If such unused sensors exist then, at step 644, the data that is available from such unused sensors is considered to determine what information can be obtained by using the unused sensors.

At step 645, the information obtainable from the unused sensors is analysed to determine if it is new information. If so, then, at step 646, it is determined whether the new information could be required by existing stakeholders. For example, such new information could provide a useful confirmatory indication of the condition of the platform.

If the new information is required by the existing stakeholders, then, at step 647, the appropriate data flow links are established in the design. This includes inserting the appropriate information requirement and data requirement blocks, connecting them to the appropriate existing stakeholder, and inserting a suitable data handling procedure to link the new data requirement blocks to the previously-unused sensor.

In this way, steps 643 to 647 constitute a 'bottom-up' analysis of the platform, so as to ensure that the health management system is as useful as possible and so that existing sensors can be used where possible in a dual-purpose role, thereby improving efficiency.

If the new information generated by an unused sensor is not required by the existing stakeholders, then, at step 648, removal of that potentially redundant sensor is considered. An unused sensor is considered redundant if it is not required for any other reason (i.e. it does not provide data to any part of the platform). By identifying redundant sensors, the design process can improve the efficiency of a platform.

Having established either that there are no unused sensors in step 643, or that no new information is generated by such sensors in step 645, or having established appropriate links with such sensors in step 647, the design of the secondary sub-system can be considered to be finalised.

However, as noted above, it is advantageous to allow for changes in the configuration and use of a legacy platform during its service life. To this end, at step 649 in FIG. 13, it is determined whether changes are required to the stakeholders or to their information requirements as a result of changes to the platform when it is in service.

If no changes are required, then the design step 607a is concluded. If, however, changes are required, then, at step 650, it is established whether the change is an addition of an entity or a removal.

If a stakeholder or an information requirement is added, then it is necessary to repeat the design process, re-starting at step 640, to deal with the new data requirements that will arise from inclusion of a new stakeholder or information requirement.

If a stakeholder or an information requirement is removed then, at step 651, all of the data requirements and the data flows (including connectors and data handling procedures) associated with the removed block are also removed, if they do not impact (i.e. are not connected to) other stakeholders.

Step 649 can be considered as a constantly-recurring step during the operational life of the platform, whereby it can be determined whether it is necessary to modify the health management system to account for changes in the stakeholders.

It will be appreciated that performing the design process in accordance with step 607a of the method not only facilitates the design of an efficient and useful health management system, but is also capable of improving the efficiency of the platform upon which it is based by identifying missing sensors that should be added, unused sensors whose presence could be exploited, and redundant sensors that can be removed. In this way, the present invention provides a method for optimising a sensor array of a platform.

Checking for Broken Links

As noted above, after the completion of step 607a, and also after the completion of step 623, the layers of the health management system 260 in the design tool are populated with multiple blocks, and blocks in adjacent layers are linked to one another via connectors 214. Such an arrangement can become very complex, particularly when multiple stakeholders and/or multiple sub-systems are involved.

It is therefore desirable to perform steps 607b, 624 involving automated checking for broken links during design of the health management system 260.

The design tool includes a set of pre-defined rules that can be applied to a proposed design using a suitable algorithm to identify any missing connections (for example, blocks that are not appropriately connected directly or indirectly to another block of a defined type).

For example, a simple set of rules that would be appropriate for checking the integrity of a health management system 260 designed using the tool 500 illustrated in FIG. 9 are as follows:
1. An information requirement must be connected to at least one sensor;
2. A sensor must be connected to at least one information requirement;
3. A stakeholder must have at least one information requirement; and
4. A sensor must belong to exactly one subsystem.

These rules can be expressed in terms of required start block types and required end block types for a connection path. For example, for rule 1, the required start block type is an information requirement block, and the required end block type is a sensor.

Figure 14:
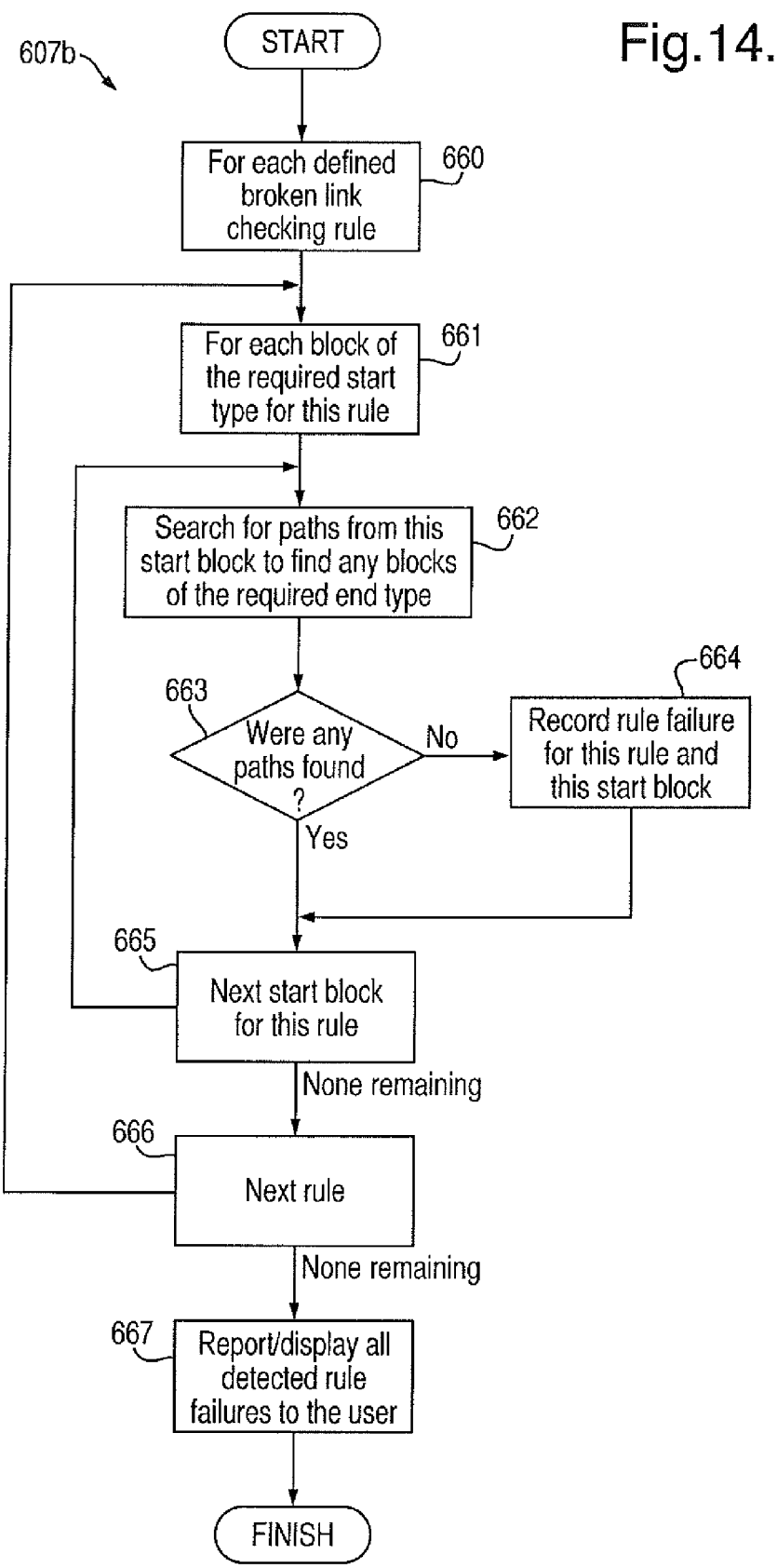
FIG. 14 is a flowchart illustrating, in greater detail, a checking step of the method shown in FIG. 11.

FIG. 14 is a flowchart illustrating an algorithm suitable for checking compliance with these rules in the broken link checking steps 607b, 624.

The algorithm comprises a nested loop, such that for each broken link checking rule, and for each block included in the design of the health management system of a required start type for the rule, a search is performed.

Having identified, at step 660, the rule under consideration and, at step 661, a block of the required start type, a search is performed at step 662 to identify paths from the start block to find any blocks of the required end type. At step 663, it is established whether any such paths are present.

If no such path is present, then, at step 664, a rule failure for the rule and block under consideration is recorded.

If a path is found, or once the lack of a path has been recorded as a rule failure, the next block of the required start type is considered (step 665). Once all blocks of the required start type have been considered, compliance with the next rule is analysed (step 666). Finally, once all of the rules have been analysed, the detected rule failures are suitably reported or displayed to the user (step 667).

Figure 15A:
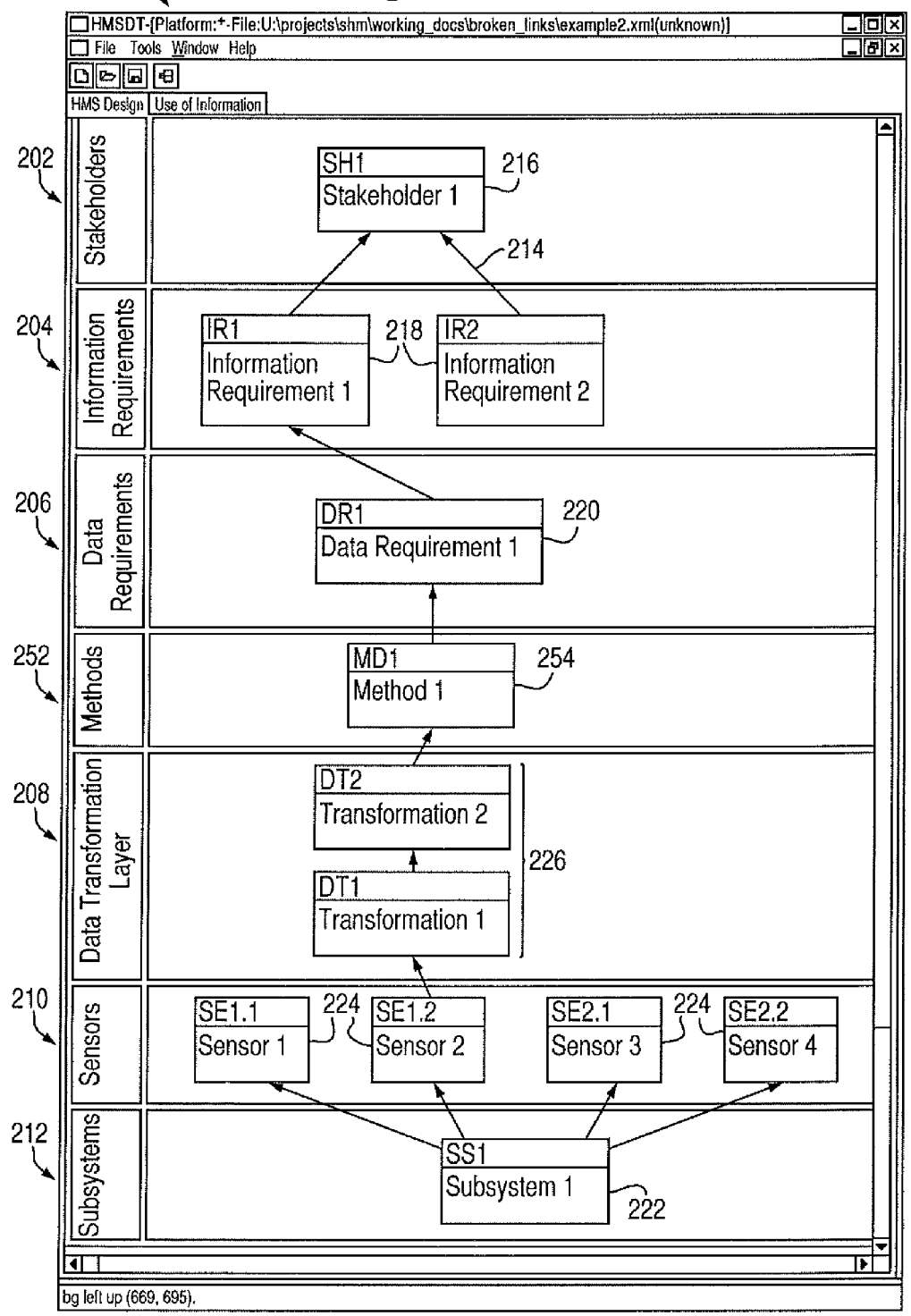
FIG. 15(a) shows a graphical user interface of a design tool for implementing the method of FIG. 11.
Figure 15B:
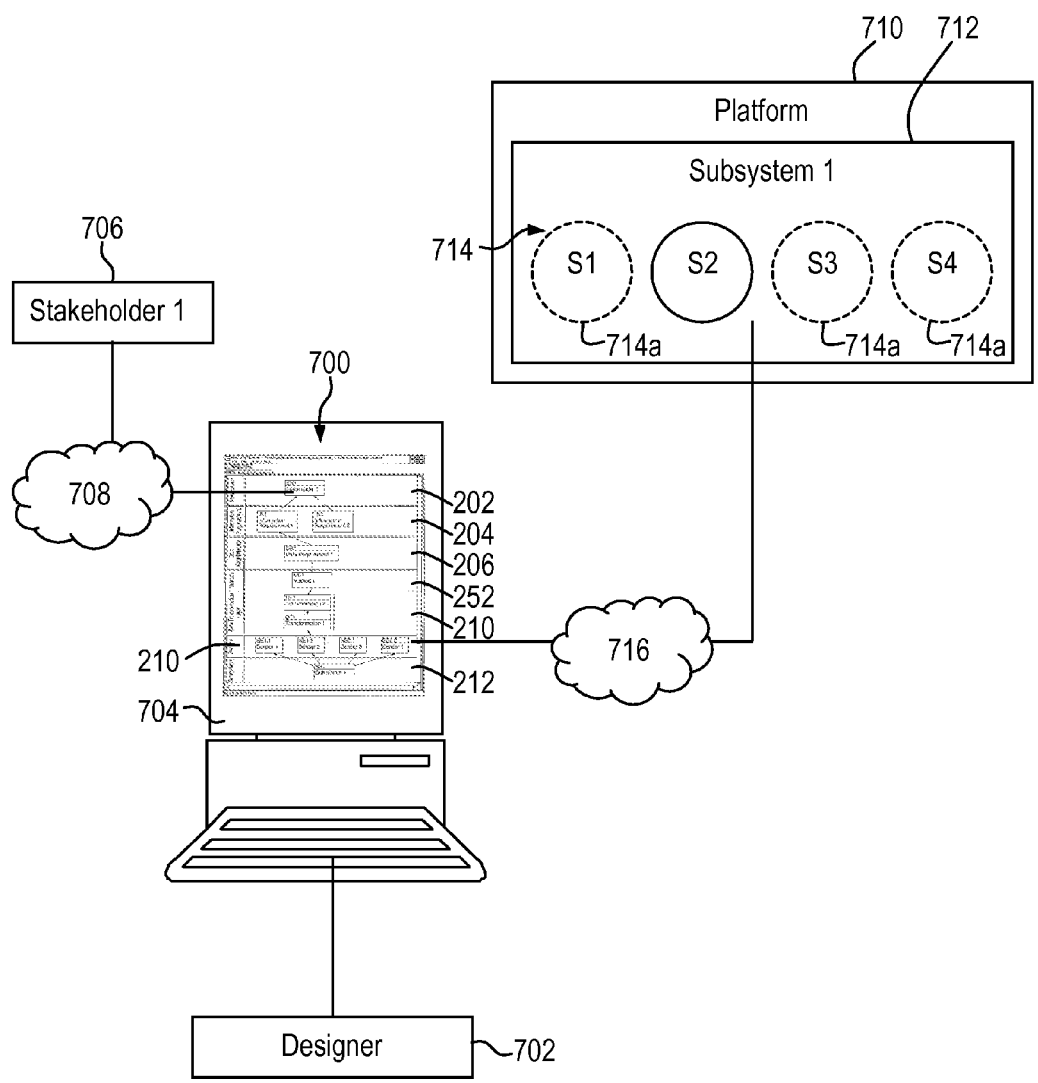
FIG. 15(b) shows the design tool of FIG. 15(a) in use.

By way of example, FIG. 15(a) shows a design tool 700 according to the invention, in which a simple health management system similar to that shown in FIG. 7 is being created. FIG. 15(b) shows the design tool 700 in use by a designer 702. The design tool 700 comprises a graphical user interface showing the hierarchical layers containing blocks representing pieces of information, connected to one another via connectors 214 and data handling procedures 226. The reference numerals in FIG. 15(a) correspond to those in FIG. 7.

As shown in FIG. 15(b), the design tool 700 is deployed on a computer system 704 such as a personal computer. In an example of the use of the design tool the designer 702 obtains information from a stakeholder 706, optionally via a communications network 708, to populate the stakeholders layer 202 and the information requirements layer 204 of the design tool.

The designer 702 also obtains information about the platform 710, the relevant subsystem 712, and the sensors 714 available in that subsystem 712. Again, the information may optionally be transmitted to the designer 702 via a communications network 716. The designer 702 can use this information to populate the subsystems layer 212 and the sensors layer 210 of the design tool 700.

The designer then populates the data requirements layer 206, the methods layer 252 and the data transformations layer 208 of the design tool 700, as described previously, to arrive at the design shown in FIG. 15(a).

Optionally applying the example broken link checking rules outlined above to the design shown in FIG. 15(a) using the algorithm of FIG. 14 gives the following results:
Rule 1: Information requirement 1 is connected to sensor 2, and passes; information requirement 2 has no path to a sensor and fails.
Rule 2: Sensor 2 is connected to an information requirement and passes; sensors 1, 3 and 4 do not have a path to an information requirement and fail.
Rule 3: Stakeholder 1 has paths to at least one information requirement and passes.
Rule 4: All sensors belong to exactly one subsystem and pass.

It can be seen, therefore, that applying the algorithm of FIG. 14 results in identification of unused sensors in the sensors layer 210, and unfulfilled information requirements in the information requirements layer 204. As illustrated by the dashed lines in FIG. 15(b), the unused sensors 714a could be considered as candidates for removal from the subsystem 712 if, once all other broken link checking rules are satisfied, these sensors still fail Rule 2 above.

Rule failures could for example be recorded by issuing a textual warning on a console displayed by the tool, or by using a visual effect in conjunction with the block in the graphical user interface of the design tool.

The broken link checking steps 607b, 624 in the method of FIG. 11 are advantageously automatic once the proceeding steps have been completed. However, it may instead, or in addition, be useful to provide an option to manually activate the check. Furthermore, the broken link checking algorithm could be performed constantly in the background while the design tool is in used, so as to provide real-time details of rule failures using textual alerts and/or graphical effects.

Optimisation of the Design

As described above, once the health management system has been designed at the sub-system level, or once it has been integrated into the platform level and verified by checking for broken links, it can be desirable to perform a further optimisation step.

The sub-system level optimisation step 621 of the method of FIG. 11 is shown in greater detail in FIG. 16. FIG. 16 also corresponds to the platform-level optimisation step 625.

The optimisation procedure that takes place in the optimisation step 621 starts by recording attributes relating to the sensors in the sensor layer 210 (step 800 in FIG. 16). Such attributes could, for example, relate to the resource usage of a sensor. Such attributes might include the form factor of the sensor (e.g. volume or cross-sectional area), its purchase cost, its weight, its power consumption and so on. The attributes could relate to the performance of a sensor, with examples of such attributes including the accuracy of the sensor, its resolution, its reliability, its data output rate, its operating temperature range and so on.

Sensor attributes may also relate to the hardware associated with a sensor, such as the signal cables or connectors required to connect a sensor to the processor or other device in which the data handling procedures are performed. Again, these attributes can relate to resource usage, such as the weight and cost of a sensor's connectors (which could be significant for a sensor located in a remote part of the platform), and to performance of the connectors, such as the data transfer rates, reliability, operating temperature range, and so on. Attributes could also relate to software and/or hardware used to process data from a sensor, such as data storage requirements, processor demands and so on.

At step 801, for each top-level data requirement, attributes (including the attributes of any associated hardware and software) of the sensors whose output signals are used to fulfil that data requirement are aggregated. This defines data requirement attributes, which capture the net attributes associated with each data requirement. Thus, for example, the net cost, cumulative accuracy, net reliability and net weight of the sensors required to fulfil each data requirement is captured by the data requirement attributes.

Similarly, at step 802, for each information requirement, the data requirement attributes of the data requirements associated with that information requirement are aggregated. This step defines information requirement attributes, which capture the aggregate attributes associated with each information requirement.

At step 803, the aggregation process is repeated for each stakeholder, so that the information requirements attributes of the information requirements associated with a stakeholder are combined to define stakeholder attributes. The stakeholder attributes thereby capture the net attributes associated with each stakeholder. For example, the net weight added by fulfilling all of a stakeholder's requirements can be captured in this way.

Finally, at step 804, the aggregated data for the data requirements, information requirements, and stakeholders are exported into a suitable format, for example a table, to enable the sensors, data requirements, information requirements and stakeholders to be sorted or ranked in terms of attributes relating to resource usage, performance and other factors.

As will be appreciated by a person skilled in the art, each aggregation step involves applying appropriate aggregation rules. For example, in the case of an attribute relating to the weight of a sensor, all of the weight of the sensor should be accounted for at the stakeholders level. In some circumstances, it may be appropriate to allocate the weight by sharing it equally between all of the stakeholders that have information requirements that are fulfilled by that sensor. In other circumstances, a more sophisticated aggregation rule might be appropriate, for example to allocate the weight unequally between stakeholders according to the importance of their respective information requirements.

The designer of the system can then evaluate each element of the health management system in terms of its physical impact on the available resources of the platform and the performance of the health management system. In particular, by comparing attributes between blocks within levels, the attribute information can be used in a trade-off analysis to make decisions regarding the design of the system by comparing the importance of a stakeholder, information requirement or data requirement with the net attributes associated with fulfilling the stakeholder's needs or the information or data requirement.

For example, as a result of a trade-off analysis made possible by the optimisation step, it may be decided to remove a stakeholder from the health management system on the basis that the impact on the resource usage of the system is disproportionate to the benefit of that stakeholder to the overall functioning of the platform.

As a further example, a trade-off analysis may allow the designer to recognise that the net reliability of the sensors used to fulfil a stakeholder's information requirements is below an acceptable level, but that the net weight and cost of the sensors is sufficiently low to entertain the possibility accepting a weight and cost penalty associated with using more reliable sensors.

Attributes can be compared to an available budget of resources. For example, there may be design limits on cost, weight and power consumption. By analysing the impact of the resource usage on the budget at the stakeholder level, rather than at the sensor level, a more useful optimisation of the system within the available budget can be obtained. For instance, a particular sensor may use a large proportion of an available budget for one attribute, but may be valuable to several stakeholders in which case the resource usage may be found acceptable. Without aggregating the attributes at the stakeholder level, a designer could be mislead into removing the sensor.

In addition, by establishing net attributes of the components of the health management system in this way, the attributes of the health management system as a whole can be determined. For example, the physical size, weight and cost of the system can be evaluated, along with the computing power required to process the information, and the electrical power required to operate the system.

It will be appreciated that this attribute-based optimisation process could be integrated into a health management system design tool so that the designer can see the impact on resources as the design of the system proceeds.

Connector Tagging

As previously described, the blocks in the hierarchical layer structure are linked by connectors (214 in FIGS. 2, 4, 5, 6, 7, 8 and 15). The connectors 214 represent signals, data flows, or information flows between blocks.

When implementing a health management system designed in accordance with the invention in a platform, the connectors 214 may be embodied as communications buses, data links, network communications, memory read/write operations, and so on.

In some cases, it is useful to provide additional information about the nature and capability of the connectors 214. Optionally, therefore, the connectors 214 may be tagged with information such as data transfer rates, resource usage, and so on. Furthermore, the connectors 214 could be tagged with information such as unique connector numbers, signal names, and so on. In the design tool of FIG. 9, for example, the graphical user interface 500 can allow input and display of information tagged to a connector when the user selects an existing connector 214 or creates a new connector 214.

The information captured by connector tagging can be of great value when building, testing and integrating a health management system on an actual platform, as it gives a detailed architectural view of the data structure and design of the health management system, and allows identification of signals required for testing and fault finding during integration.

Furthermore, as noted above, when attributes relating to performance or resource usage information such as power consumption, computer resource usage and so on is tagged to a connector 214, it is possible to include the connector tag information in the optimisation method of FIG. 16.

Generic Design Approach

It is a particular advantage of the method of designing a secondary sub-system for monitoring the condition of a platform described above that the method is applicable to a platform of substantially any type.

Although the method is particularly useful in designing a health management system for an air-based vehicle such as an unmanned aerial vehicle or a military or commercial aircraft, the method could also be used to design a health management system for substantially any type of platform. For example, the method could be used to design a health management system for land or sea-based mobile platforms, such as automobiles, military land vehicles, submarines and ships, or for fixed platforms such as power plants, chemical plants, offshore oil and gas platforms, and large-scale experimental apparatus such as particle accelerators and fusion reactors.

Furthermore, the method is not limited to the design of a health management system. Instead, the method can be used to design other types of sub-system that are used for monitoring the condition of a platform. For example, as illustrated in FIG. 4, the method can be used to design a sub-system of an automobile platform that monitors the speed condition of the automobile. Further examples of sub-systems that could be designed by the method include damage reporting systems, service indicators and fault detection systems. It will be appreciated, however, that the method is particularly suitable for designing complex sub-systems capable of monitoring many interconnected primary sub-systems of a platform.

The generic applicability of the method is achieved, in part, by the hierarchical layer structure imparted on the secondary sub-system by the method. The layers present to a designer the required design features of a condition-monitoring sub-system in a logical and generic order, aiding the design process of establishing logic to generate the required information from the raw data available from the platform.

Furthermore, the layers are not restrictive in terms of the entities represented by the blocks in the layers. For example, stakeholder blocks could represent human stakeholders, other platforms, or primary sub-systems of the same platform for which the secondary sub-system is being designed. The freedom of being able to specify a range of block types in each layer allows the method to cater for a wide variety of platforms and stakeholders.

As noted above, the method can be used to design a secondary sub-system for an existing, legacy platform, or for a new platform. In the case of a legacy platform, it is likely that the stakeholders and sub-systems will be known from the outset.

During the development of a new platform, however, the actual stakeholders, sub-systems, and sensors may not yet be known, or may change over the course of development. The present method provides for this possibility by allowing the designer initially to populate a design tool with generic blocks representing generic stakeholders, sub-systems, sensors and so on, so that an initial structure of the secondary sub-system can be developed without waiting until a later stage of the development of the platform. Then, as actual stakeholders, sub-systems and sensors are specified, the generic blocks can be replaced with the appropriate actual entities. Consequently, the method advantageously allows the design of the secondary sub-system to begin early in the design lifecycle of a new platform, which in turn improves the extent to which the secondary sub-system can be integrated with the platform.

As described with reference to FIG. 11, above, the secondary sub-system is developed as distinct, non-linked modules, each connected to a single primary sub-system of the platform. The modules are then integrated with one another to create a platform-wide secondary sub-system (step 623 in FIG. 11). During the design of a secondary sub-system for a new platform, it may be convenient to perform step 623 only once all of the sub-systems of the platform have been specified. In some cases, for example where the secondary sub-system is relatively simple, it may be acceptable to omit integration of the modules altogether and instead retain distinct modules for each primary sub-system of the platform.

It will also be appreciated that the method allows a modular design approach to be taken. A new stakeholder or primary sub-system can readily be added to the specification of the secondary sub-system, without requiring modification of the existing design. Similarly, it is possible to substitute or remove stakeholders or sub-systems with minimal disruption to the remaining information flows.

Thus the method advantageously caters for changes in the configuration of a platform or a platform design, and changes in the stakeholders and their requirements during the design process of a new platform or the maturation of an existing platform.

It is to be understood that any feature described in relation to any one embodiment or method described above may be used alone, or in combination with other features described, and may also be used in combination with one or more features of any other of the embodiments or methods, or any combination of any other of the embodiments or methods. Further, equivalents and modifications not described above may also be employed without departing from the scope of the invention, which is defined in the accompanying claims.

The invention claimed is:

1. A method for designing a secondary sub-system for monitoring the condition of a platform having at least one primary sub-system, the method comprising:
   identifying stakeholders of the platform;
   capturing information requirements of the stakeholders;
   determining data requirements corresponding to the information requirements;

defining a sensor array comprising sensors suitable for providing output signals relating to condition characteristics of the at least one primary sub-system;

defining procedures for converting the output signals from the sensor array to the data requirements, thereby to fulfil the information requirements of the stakeholders;

identifying new data requirements that could be fulfilled by the output signals of unused sensors of the sensor array; and identifying new information requirements that could be fulfilled by the new data requirements.

2. The method of claim 1, wherein the platform includes a plurality of primary sub-systems, and wherein the method comprises:

before defining the sensor array, identifying the primary sub-systems from which the data requirements can be fulfilled;

and wherein the sensor array includes sensors suitable for providing output signals relating to condition characteristics of the identified primary sub-systems.

3. The method of claim 1, wherein defining the sensor array comprises:

identifying existing sensors of the identified primary sub-systems having output signals suitable for conversion to fulfil the data requirements.

4. The method of claim 3, wherein defining the sensor array comprises:

identifying unfulfilled data requirements that cannot be fulfilled by the existing sensors; and specifying new sensors for inclusion in the sensor array so as to provide output signals suitable for fulfilling said unfulfilled data requirements.

5. The method of claim 1, wherein identifying new data requirements that could be fulfilled by the output signals of unused sensors of the sensor array further includes identifying sensors as unused sensors in the sensor array based on respective output signals not being used to fulfil the data requirements.

6. The method of claim 5, comprising:

identifying any existing data requirements that could be fulfilled by said output signals of said unused sensors; and defining one or more procedures for converting said output signals to said existing data requirements.

7. The method of claim 5, comprising:

determining whether said new information requirements are useful to one or more stakeholders;

and, if so, defining procedures for converting said output signals to said new data requirements.

8. The method of claim 1, comprising optimising the sensor array by:

identifying any redundant sensors in the sensor array whose output signals are not required by the secondary sub-system;

determining whether the output signals of the redundant sensors are required by a primary sub-system of the platform; and if one or more of the redundant sensors are not so required, removing those sensors from the sensor array.

9. The method of claim 1, wherein the defining of procedures comprises:

defining a plurality of alternative procedures for converting one or more of the signals to one of the data requirements.

10. The method of claim 9, comprising:

assigning a method classification to each one of the plurality of alternative procedures.

11. The method of claim 9, comprising:

selecting one or more of the plurality of alternative procedures.

12. The method of claim 11, comprising:

determining an operating environment of the platform; and selecting one or more of the plurality of alternative procedures according to the operating environment.

13. The method of claim 1, comprising:

recording one or more attributes of each of the sensors in the sensor array;

for each data requirement, aggregating the attributes of the sensors whose output signals are used to fulfil that data requirement to define data requirement attributes;

for each information requirement, aggregating the data requirement attributes of the data requirements associated with that information requirement to define information requirement attributes; and for each stakeholder, aggregating the information requirements attributes of the information requirements associated with that stakeholder to define stakeholder attributes.

14. The method of claim 13, wherein one or more of the attributes relate to resource usage of the sensors, and wherein the method comprises:

optimising the design of the secondary sub-system by using one or more of the data requirements attributes, information requirements attributes and stakeholder attributes to determine a net resource usage of the respective data requirements, information requirements and stakeholders.

15. The method of claim 14, wherein the optimising of the design of the secondary sub-system comprises:

eliminating one or more of the sensors, data requirements, information requirements and stakeholders based on the determined net resource usage.

16. The method of claim 1, comprising:

representing the secondary sub-system in a graphical format, the graphical format having a hierarchical structure of information layers including:

a stakeholders layer including stakeholder blocks representing the stakeholders;

an information requirements layer adjacent to the stakeholders layer and including information requirements blocks representing the information requirements;

a data requirements layer adjacent to the information requirements layer and including data requirements blocks representing the data requirements;

a data transformation layer adjacent to the data requirements layer and including procedure blocks representing the procedures for converting the output signals to the data requirements;

a sensors layer adjacent to the data transformation layer and including sensor blocks representing the signals;

a sub-systems layer adjacent to the data transformation layer and including subsystem blocks representing the primary sub-systems of the platform; and connectors for representing information flows between blocks in adjacent layers.

17. The method of claim 16, comprising:

verifying the design of the secondary sub-system by:

selecting a block in one of the information layers;

determining whether the block is appropriately connected to blocks in adjacent layers; and if the block is not appropriately connected, recording a failure in respect of that block.

18. The method of claim 17, wherein the recording of a failure comprises:

providing a graphical indication relating to the block that is not appropriately connected.

19. A system comprising:
a processor;
a memory including instructions executable by the processor to carry out a process for designing a secondary sub-system for monitoring the condition of a platform having at least one primary sub-system, the process configured to:
identify stakeholders of the platform;
capture information requirements of the stakeholders;
determine data requirements corresponding to the information requirements;
define a sensor array comprising sensors suitable for providing output signals relating to condition characteristics of the at least one primary sub-system;
define procedures for converting the output signals from the sensor array to the data requirements, thereby to fulfil the information requirements of the stakeholders;
identify new data requirements that could be fulfilled by the output signals of unused sensors of the sensor array; and
identify new information requirements that could be fulfilled by the new data requirements;
a graphical user interface comprising a hierarchical structure of information layers including:
a stakeholders layer including stakeholder blocks representing the stakeholders;
an information requirements layer adjacent to the stakeholders layer and including information requirements blocks representing the information requirements;
a data requirements layer adjacent to the information requirements layer and including data requirements blocks representing the data requirements;
a data transformation layer adjacent to the data requirements layer and including procedure blocks representing the procedures for converting the output signals to the data requirements;
a sensors layer adjacent to the data transformation layer and including sensor blocks representing the sensors;
a sub-systems layer adjacent to the data transformation layer and including sub-system blocks representing the primary sub-systems of the platform; and
connectors for representing information flows between blocks in adjacent layers.

20. An electronic sub-system for monitoring the condition of a platform including a plurality of further sub-systems, the sub-system comprising:
a sensors layer comprising a plurality of electronic sensors arranged to output signals relating to condition characteristics of the further sub-systems; and
one or more electronic memories, including:
a stakeholder layer specifying stakeholders in the platform;
an information requirements layer specifying condition-related information requirements of the stakeholders;
a data requirements layer, comprising data requirements corresponding to the information requirements;
a data transformation layer comprising procedures for converting the output signals to the data requirements, thereby to fulfil the information requirements of the stakeholders;
new data requirements fulfillable by the output signals of unused sensors of the sensor array; and
new information requirements fulfillable by the new data requirements.

21. A computer program product comprising a plurality of instructions encoded on one or more non-transitory computer-readable mediums that when executed by one or more processors causes the method of claim 1 to be carried out.

22. A computer program product comprising plurality of instructions encoded on one or more non-transitory computer-readable mediums that when executed by one or more processors instantiate a software tool arranged to allow a user to design a secondary sub-system for monitoring the condition of a platform comprising a plurality of primary sub-systems using the method of claim 1.

* * * * *